United States Patent
Abdelghaffar et al.

(10) Patent No.: US 10,382,233 B2
(45) Date of Patent: Aug. 13, 2019

(54) HETEROGENEOUS WEIGHTED OVERLAP-ADD WINDOWING AND FILTERING FOR ORTHOGONAL FREQUENCY DIVISION MULTIPLEXING WAVEFORMS

(71) Applicant: QUALCOMM Incorporated, San Diego, CA (US)

(72) Inventors: Muhammad Sayed Khairy Abdelghaffar, Santa Clara, CA (US); Jing Jiang, San Diego, CA (US); Seyong Park, San Diego, CA (US); Wei Zeng, San Diego, CA (US); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 15/395,814

(22) Filed: Dec. 30, 2016

(65) Prior Publication Data
US 2017/0331647 A1 Nov. 16, 2017

Related U.S. Application Data

(60) Provisional application No. 62/335,645, filed on May 12, 2016.

(51) Int. Cl.
*H04L 25/03* (2006.01)
*H04L 27/26* (2006.01)
*H04B 7/26* (2006.01)

(52) U.S. Cl.
CPC .... *H04L 25/03006* (2013.01); *H04L 27/2634* (2013.01); *H04B 7/2621* (2013.01); *H04L 27/2601* (2013.01)

(58) Field of Classification Search
CPC combination set(s) only.
See application file for complete search history.

(56) References Cited

U.S. PATENT DOCUMENTS

| | | | | |
|---|---|---|---|---|
| 2013/0058432 A1* | 3/2013 | Futatsugi | ............ | H04J 11/0036 375/296 |
| 2014/0233664 A1* | 8/2014 | Abdoli | ............... | H04L 27/2698 375/261 |

(Continued)

FOREIGN PATENT DOCUMENTS

JP 2008078790 A 4/2008

OTHER PUBLICATIONS

ISA/EP, International Search Report and Written Opinion of the International Searching Authority, Int'l Application No. PCT/US2017/031308, dated Aug. 10, 2017, European Patent Office, Rijswijk, NL, 14 pgs.

(Continued)

*Primary Examiner* — Yee F Lam
(74) *Attorney, Agent, or Firm* — Holland & Hart LLP

(57) ABSTRACT

Techniques for processing of symbols (e.g., orthogonal frequency division multiplexing (OFDM) or single carrier-frequency division multiple access (SC-FDMA) symbols) provide enhanced out-of-band (OOB) suppression of the symbols and also provide reduced inter-symbol interference (ISI) between a symbol and a subsequent symbol. Multiple frequency tones of a symbol may be divided into two or more subsets of tones. For example, subsets of tones associated with a head portion or a tail portion of an OFDM symbol may be processed with a relatively long weighted overlap-add (WOLA) weighting length or filtering length, and a subset of tones associated with a center portion of the OFDM symbol may be processed with a relatively short WOLA weighting length or filtering length. Such heterogeneous processing of tones within a symbol may provide (Continued)

enhanced inter-channel interference (ICI) and improved OOB suppression and also provide reduced ISI for the center tones of the symbol.

13 Claims, 31 Drawing Sheets

(56) References Cited

U.S. PATENT DOCUMENTS

| | | | | |
|---|---|---|---|---|
| 2015/0349987 | A1* | 12/2015 | Soriaga | H04L 25/03834 |
| | | | | 370/329 |
| 2016/0269135 | A1* | 9/2016 | Jiang | H04L 5/0037 |
| 2016/0380689 | A1* | 12/2016 | Sun | H04L 1/206 |
| | | | | 370/330 |
| 2017/0279579 | A1* | 9/2017 | Qian | H04B 7/0452 |

OTHER PUBLICATIONS

Renfors et al., "Efficient Fast-Convolution Implementation of Filtered CP-OFDM Waveform Processing for 5G," 2015 IEEE Globecom Workshops (GC WKSHPS), Dec. 6, 2015, 7 pgs., XP032871024, DOI: 10.1109/GLOCOMW.2015.7414034, Institute of Electrical and Electronics Engineers.

* cited by examiner

HETEROGENEOUS WEIGHTED OVERLAP-ADD WINDOWING AND FILTERING FOR ORTHOGONAL FREQUENCY DIVISION MULTIPLEXING WAVEFORMS

CROSS REFERENCES

The present application for patent claims priority to U.S. Provisional Patent Application No. 62/335,645 by Abdelghaffar, et al., entitled "Heterogeneous Weighted Overlap-ADD Windowing And Filtering For Orthogonal Frequency Division Multiplexing Waveforms," filed May 12, 2016, assigned to the assignee hereof.

INTRODUCTION

The present disclosure, for example, relates to wireless communication systems, and more particularly to techniques for heterogeneous weighted overlap-add (WOLA) windowing and filtering for orthogonal frequency division multiplexing (OFDM) and single carrier-frequency division multiple access (SC-FDMA) waveforms.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, otherwise known as user equipment (UEs). In a Long-Term Evolution (LTE) or LTE-Advanced (LTE-A) network, a set of one or more base stations may define an eNodeB (eNB). In other examples (e.g., in a next generation or 5G network), a wireless multiple access communication system may include a number of smart radio heads (radio heads (RHs)) in communication with a number of access node controllers (ANCs), where a set of one or more radio heads, in communication with an ANC, may define an eNB. A base station or radio head may communicate with a set of UEs on downlink channels (e.g., for transmissions from a base station or radio head to a UE) and uplink channels (e.g., for transmissions from a UE to a base station or radio head).

In some examples, a UE and a network device (e.g., a network access device (e.g., a radio head, a base station, an eNB, or an ANC) may communicate using symbols (e.g., OFDM or SC-FDMA symbols). Many systems that transmit using symbols may perform signal processing to help suppress out-of-band (OOB) transmissions, such as through weighted overlap-add (WOLA) processing of transmissions. Such techniques may help suppress OOB transmissions, but may increase inter-symbol interference at a subsequent symbol.

SUMMARY

The present disclosure describes techniques for processing of symbols (orthogonal frequency division multiplexing (OFDM) or single carrier-frequency division multiple access (SC-FDMA) symbols) to provide enhanced out-of-band (OOB) suppression of the symbols and also provide reduced inter-symbol interference (ISI) between a symbol and a subsequent symbol. In some examples, multiple frequency tones of a symbol may be divided into two or more subsets of tones, and different subsets of tones may be processed using one or more different processing parameters. In some examples, subsets of tones associated with a head portion or a tail portion of a symbol may be processed with a relatively long weighted overlap-add (WOLA) weighting length or filtering length, and a subset of tones associated with a center portion of the symbol may be processed with a relatively short WOLA weighting length or filtering length. Such heterogeneous processing of tones within a symbol may provide enhanced inter-channel interference (ICI) and improved OOB suppression and also provide reduced ISI for the center tones of the symbol.

A method of wireless communication is described. The method may include identifying a set of tones of a first orthogonal frequency division multiplexing (OFDM) symbol, a first subset of the set of tones, and a second subset of the set of tones, applying a first type of weighting window to the first subset of the set of tones and a second type of weighting window to the second subset of the set of tones in a weighted overlap and add (WOLA) procedure, the second type of weighting window being longer than the first type of weighting window, obtaining a first transmission waveform for the first OFDM symbol based at least in part on the applying, and transmitting the first transmission waveform.

An apparatus for wireless communication is described. The apparatus may include means for identifying a set of tones of a first OFDM symbol, a first subset of the set of tones, and a second subset of the set of tones, means for applying a first type of weighting window to the first subset of the set of tones and a second type of weighting window to the second subset of the set of tones in a WOLA procedure, the second type of weighting window being longer than the first type of weighting window, means for obtaining a first transmission waveform for the first OFDM symbol based at least in part on the applying, and means for transmitting the first transmission waveform.

Another apparatus for wireless communication is described. The apparatus may include a processor, memory in electronic communication with the processor, and instructions stored in the memory. The instructions may be operable to cause the processor to identify a set of tones of a first OFDM symbol, a first subset of the set of tones, and a second subset of the set of tones, apply a first type of weighting window to the first subset of the set of tones and a second type of weighting window to the second subset of the set of tones in a WOLA procedure, the second type of weighting window being longer than the first type of weighting window, obtain a first transmission waveform for the first OFDM symbol based at least in part on the applying, and transmit the first transmission waveform.

A non-transitory computer readable medium for wireless communication is described. The non-transitory computer-readable medium may include instructions operable to cause a processor to identify a set of tones of a first OFDM symbol, a first subset of the set of tones, and a second subset of the set of tones, apply a first type of weighting window to the first subset of the set of tones and a second type of weighting window to the second subset of the set of tones in a WOLA procedure, the second type of weighting window being longer than the first type of weighting window, obtain a first transmission waveform for the first OFDM symbol based at least in part on the applying, and transmit the first transmission waveform.

In some examples of the method, apparatus, or non-transitory computer-readable medium described above, the first subset of the set of tones comprises a center portion of the set of tones and the second subset of the set of tones comprises a head portion of the set of tones.

Some examples of the method, apparatus, or non-transitory computer-readable medium described above may further include processes, features, means, or instructions for identifying a third subset of the set of tones comprising a tail portion of the set of tones, and wherein the applying further comprises applying a third type of weighting window to the third subset of the set of tones in the WOLA procedure to obtain the first transmission waveform. In some examples of the method, apparatus, or non-transitory computer-readable medium described above, the third type of weighting window is longer than the first type of weighting window.

Some examples of the method, apparatus, or non-transitory computer-readable medium described above may further include processes, features, means, or instructions for selecting the first type of weighting window for a first weighting procedure to be performed on the first subset of the set of tones and selecting the second type of weighting window for a second weighting procedure to be performed on the second subset of the set of tones. Some examples of the method, apparatus, or non-transitory computer-readable medium described above may further include processes, features, means, or instructions for performing the first weighting procedure on the first subset of the set of tones to obtain a weighted first subset of samples corresponding to the first subset of the set of tones and performing the second weighting procedure on the second subset of the set of tones to obtain a weighted second subset of samples corresponding to the second subset of the set of tones. Some examples of the method, apparatus, or non-transitory computer-readable medium described above may further include processes, features, means, or instructions for overlapping and adding the weighted first subset of samples and the weighted second subset of samples to obtain the first transmission waveform.

In some examples of the method, apparatus, or non-transitory computer-readable medium described above, performing the first weighting procedure comprises: adding a cyclic prefix and a first extension length to a first subset of time domain samples corresponding to the first subset of the set of tones, the first extension length corresponding to the first type of weighting window. In some examples of the method, apparatus, or non-transitory computer-readable medium described above, performing the second weighting procedure comprises: adding the cyclic prefix and a second extension length to a second subset of time domain samples corresponding to the second subset of the set of tones, the second extension length corresponding to the second type of weighting window.

Some examples of the method, apparatus, or non-transitory computer-readable medium described above may further include processes, features, means, or instructions for repeating the identifying and the applying for a second set of tones of a second OFDM symbol to obtain a second transmission waveform for the second OFDM symbol. Some examples of the method, apparatus, or non-transitory computer-readable medium described above may further include processes, features, means, or instructions for overlapping and adding the first transmission waveform and the second transmission waveform. Some examples of the method, apparatus, or non-transitory computer-readable medium described above may further include processes, features, means, or instructions for transmitting the overlapped and added first transmission waveform and second transmission waveform.

In some examples of the method, apparatus, or non-transitory computer-readable medium described above, an amount of overlapping of the first transmission waveform and the second transmission waveform is determined based at least in part on a longest length of the first type of weighting window or the second type of weighting window.

A method of wireless communication is described. The method may include identifying a set of tones of a first OFDM symbol, a first subset of the set of tones, and a second subset of the set of tones, applying a first filter length to the first subset of the set of tones and a second filter length to the second subset of the set of tones in a bandpass filtering procedure, the second filter length being longer than the first filter length, obtaining a first transmission waveform for the first OFDM symbol based at least in part on the applying, and transmitting the first transmission waveform.

An apparatus for wireless communication is described. The apparatus may include means for identifying a set of tones of a first OFDM symbol, a first subset of the set of tones, and a second subset of the set of tones, means for applying a first filter length to the first subset of the set of tones and a second filter length to the second subset of the set of tones in a bandpass filtering procedure, the second filter length being longer than the first filter length, means for obtaining a first transmission waveform for the first OFDM symbol based at least in part on the applying, and means for transmitting the first transmission waveform.

Another apparatus for wireless communication is described. The apparatus may include a processor, memory in electronic communication with the processor, and instructions stored in the memory. The instructions may be operable to cause the processor to identify a set of tones of a first OFDM symbol, a first subset of the set of tones, and a second subset of the set of tones, apply a first filter length to the first subset of the set of tones and a second filter length to the second subset of the set of tones in a bandpass filtering procedure, the second filter length being longer than the first filter length, obtain a first transmission waveform for the first OFDM symbol based at least in part on the applying, and transmit the first transmission waveform.

A non-transitory computer readable medium for wireless communication is described. The non-transitory computer-readable medium may include instructions operable to cause a processor to identify a set of tones of a first OFDM symbol, a first subset of the set of tones, and a second subset of the set of tones, apply a first filter length to the first subset of the set of tones and a second filter length to the second subset of the set of tones in a bandpass filtering procedure, the second filter length being longer than the first filter length, obtain a first transmission waveform for the first OFDM symbol based at least in part on the applying, and transmit the first transmission waveform.

In some examples of the method, apparatus, or non-transitory computer-readable medium described above, the first subset of the set of tones comprises a center portion of the set of tones and the second subset of the set of tones comprises a head portion of the set of tones. Some examples of the method, apparatus, or non-transitory computer-readable medium described above may further include processes, features, means, or instructions for identifying a third subset of the set of tones comprising a tail portion of the set of tones, and wherein the applying further comprises applying a third filter length to the third subset of the set of tones in the bandpass filtering procedure to obtain the first transmission waveform.

In some examples of the method, apparatus, or non-transitory computer-readable medium described above, the third filter length is longer than the first filter length. Some examples of the method, apparatus, or non-transitory computer-readable medium described above may further include processes, features, means, or instructions for selecting the first filter length for a first bandpass filtering procedure to be performed on the first subset of the set of tones and selecting the second filter length for a second bandpass filtering procedure to be performed on the second subset of the set of tones. Some examples of the method, apparatus, or non-transitory computer-readable medium described above may further include processes, features, means, or instructions for performing the first bandpass filtering procedure on the first subset of the set of tones to obtain a filtered first subset of samples corresponding to the first subset of the set of tones and performing the second bandpass filtering procedure on the second subset of the set of tones to obtain a filtered second subset of samples corresponding to the second subset of the set of tones. Some examples of the method, apparatus, or non-transitory computer-readable medium described above may further include processes, features, means, or instructions for overlapping and adding the filtered first subset of samples and the filtered second subset of samples to obtain the first transmission waveform.

In some examples of the method, apparatus, or non-transitory computer-readable medium described above, performing the first bandpass filtering procedure comprises: adding a cyclic prefix to a first subset of time domain samples corresponding to the first subset of the set of tones and bandpass filtering the cyclic prefix and the first subset of time domain samples based at least in part on the first filter length.

In some examples of the method, apparatus, or non-transitory computer-readable medium described above, performing the second bandpass filtering procedure comprises: adding the cyclic prefix to a second subset of time domain samples corresponding to the second subset of the set of tones. Some examples of the method, apparatus, or non-transitory computer-readable medium described above may further include processes, features, means, or instructions for bandpass filtering the cyclic prefix and the second subset of time domain samples based at least in part on the second filter length.

Some examples of the method, apparatus, or non-transitory computer-readable medium described above may further include processes, features, means, or instructions for repeating the identifying and the applying for a second set of tones of a second OFDM symbol to obtain a second transmission waveform for the second OFDM symbol. Some examples of the method, apparatus, or non-transitory computer-readable medium described above may further include processes, features, means, or instructions for overlapping and adding the first transmission waveform and the second transmission waveform. Some examples of the method, apparatus, or non-transitory computer-readable medium described above may further include processes, features, means, or instructions for transmitting the overlapped and added first transmission waveform and second transmission waveform.

In some examples of the method, apparatus, or non-transitory computer-readable medium described above, performing the first bandpass filtering procedure comprises: adding a guard interval to a first subset of time domain samples corresponding to the first subset of the set of tones and bandpass filtering the guard interval and the first subset of time domain samples based at least in part on the first filter length.

In some examples of the method, apparatus, or non-transitory computer-readable medium described above, performing the second bandpass filtering procedure comprises: adding the guard interval to a second subset of time domain samples corresponding to the second subset of the set of tones. Some examples of the method, apparatus, or non-transitory computer-readable medium described above may further include processes, features, means, or instructions for bandpass filtering the guard interval and the second subset of time domain samples based at least in part on the second filter length.

Some examples of the method, apparatus, or non-transitory computer-readable medium described above may further include processes, features, means, or instructions for repeating the identifying and the applying for a second set of tones of a second OFDM symbol to obtain a second transmission waveform for the second OFDM symbol. Some examples of the method, apparatus, or non-transitory computer-readable medium described above may further include processes, features, means, or instructions for concatenating the first transmission waveform and the second transmission waveform. Some examples of the method, apparatus, or non-transitory computer-readable medium described above may further include processes, features, means, or instructions for transmitting the concatenated first transmission waveform and second transmission waveform.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
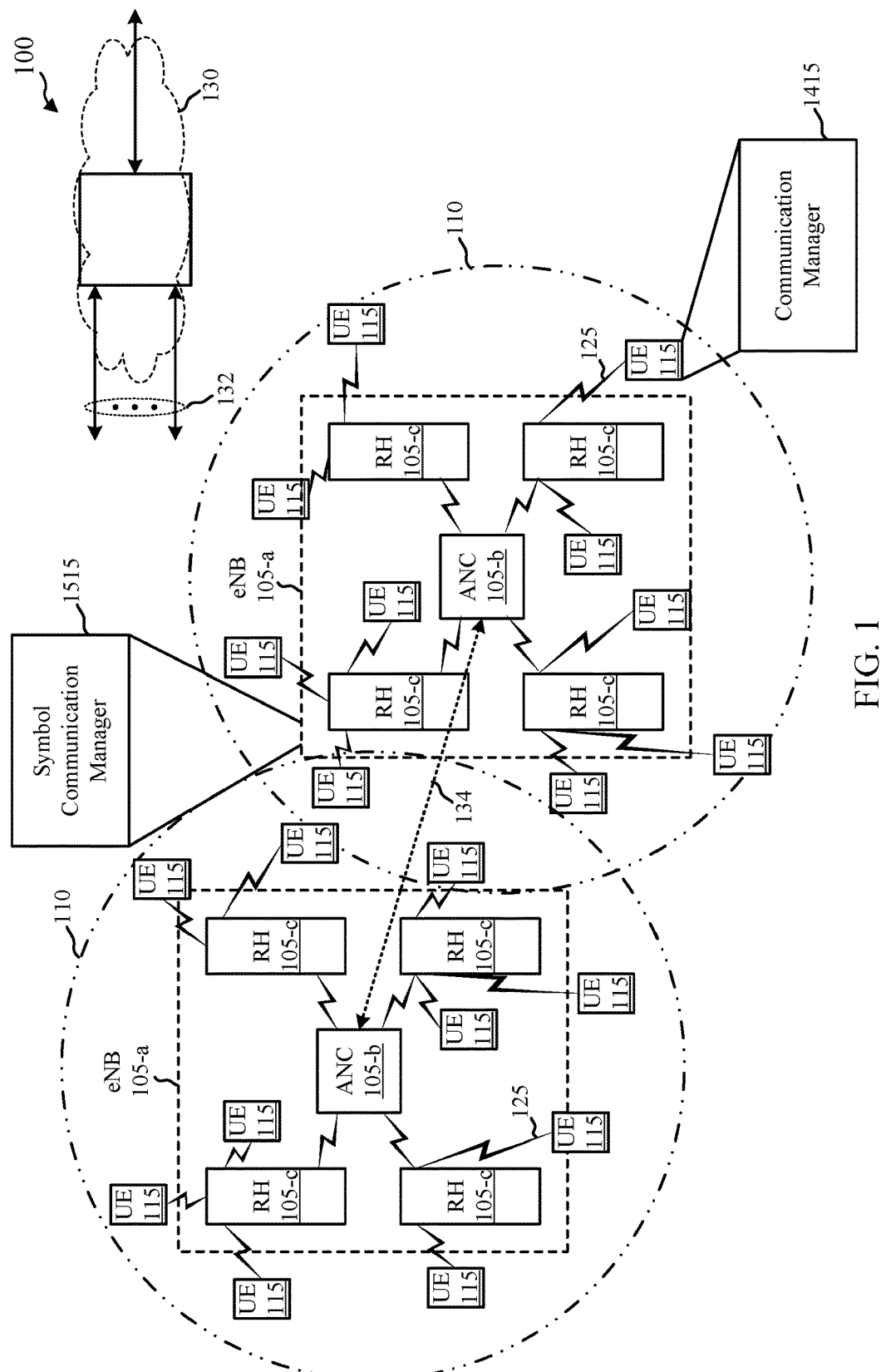
FIG. 1 shows an example of a wireless communication system, in accordance with various aspects of the disclosure.

The present disclosure describes techniques for processing of symbols (e.g., orthogonal frequency division multiplexing (OFDM) or single carrier-frequency division multiple access (SC-FDMA) symbols) to provide enhanced out-of-band (OOB) suppression of the symbols and also provide reduced inter-symbol interference (ISI) between a symbol and a subsequent symbol. In some examples, multiple frequency tones of a symbol may be divided into two or more subsets of tones, and different subsets of tones may be processed using one or more different processing parameters. In some examples, subsets of tones associated with a head portion or a tail portion (e.g., edge tones) of a symbol may be processed with a relatively long weighted overlap-add (WOLA) weighting length or filtering length, and a subset of tones associated with a center portion of the symbol may be processed with a relatively short WOLA weighting length or filtering length. Such heterogeneous processing of tones within a symbol may provide enhanced inter-channel interference (ICI) and improved OOB suppression and also provide reduced ISI for the center tones of the symbol. Heterogeneous techniques as discussed herein may be used for both transmit and receive processing.

As indicated above, in some examples WOLA techniques may be used to reduce OOB through a relatively sharp roll-off of the transmitted waveform of a symbol. Such a WOLA technique may use a windowing mask having relatively soft edges at both sides, which results in a relatively sharp side-lope decay in the frequency domain, which may help to reduce inter-channel interference (ICI). The shape of the windowing mask in the time domain (at the edges) helps determine the power spectral density (PSD) of the waveform, and in many examples a raised-cosine edge window is used that provides a compromise between a straightforward implementation and the roll-off of the transmitted waveform. As also indicated above, one disadvantage of WOLA is that WOLA-OFDM waveforms may have relatively extended ISI in wireless channels with a relatively long delay spread. In some deployments, such as some next generation or 5G systems, different services (e.g., narrow-band internet-of-things (NB-IOT) services, voice services, data services) may be multiplexed in the frequency domain such that some services may be relatively sensitive to ISI.

Various examples of the present disclosure provide techniques for reducing ISI while also providing OOB suppression and reduced ICI.

When performing previous WOLA procedures, a transmitter may identify a symbol to be transmitted, and perform an inverse fast Fourier transform (IFFT) on frequency tones of the symbol and do a parallel to serial conversion of the IFFT output to obtain time samples corresponding to the symbol. The transmitter may then add a cyclic prefix (CP) to the time samples, and pad the beginning and end of the symbol time samples to provide an overlap extension at the beginning and the end of the symbol. A windowing mask, with soft right and left edges, may then be applied to provide a waveform for transmission of the symbol. Finally, adjacent symbols are overlapped and added in the edge transition region. A WOLA weighting length associated with the windowing mask may have an impact on the ISI between adjacent transmitted symbols, as well as on the amount of roll-off of the waveform. Thus, a relatively small WOLA weighting length may reduce the ISI effect but may not provide efficient OOB suppression.

As indicated above, examples of the present disclosure provide that frequency tones of a symbol may be divided into two or more subsets of tones, and different subsets of tones may be processed using one or more different processing parameters, such as different WOLA weighting lengths or filtering lengths. In some examples, subsets of tones associated with a head portion and/or a tail portion (e.g., edge tones) of a symbol may be processed with a relatively long WOLA weighting length, and a subset of tones associated with a center portion of the symbol may be processed with a relatively short WOLA weighting length. Such heterogeneous processing of tones within a symbol may provide enhanced ICI and improved OOB suppression at transmission edges, and also provide reduced ISI for the center tones of the symbol. The different portions of the symbol may be overlapped to form a transmission waveform for the symbol, which may be overlapped and added with adjacent symbol transmission waveforms.

In some examples, heterogeneous processing of a symbol may be used in conjunction with transmission filtering using a bandpass filter. In such examples, subsets of tones associated with a head portion or a tail portion of a symbol may be processed with a relatively long filter length (e.g., a relatively large number of samples or taps at a finite impulse response (FIR) filter), and a subset of tones associated with a center portion of the symbol may be processed with a relatively short filter length. Such heterogeneous processing of tones within a symbol may provide enhanced spectral shape for OOB suppression at transmission edges, and also provide reduced ISI for the center tones of the symbol. The different portions of the symbol may be overlapped to form a transmission waveform for the symbol. In some examples a CP may be added to the symbol transmission, and the transmission waveform for the symbol may be overlapped and added with adjacent symbol transmission waveforms. In certain examples, such a CP may simply be replaced by a guard interval, and the different portions of the symbol may be added to form the symbol transmission waveform which may simply be concatenated with other symbol transmission waveforms.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples.

FIG. 1 shows an example of a wireless communication system 100, in accordance with various aspects of the disclosure. The wireless communication system 100 may include network access devices 105, UEs 115, and a core network 130. The core network 130 may provide user authentication, access authorization, tracking, Internet Protocol (IP) connectivity, and other access, routing, or mobility functions. At least some of the network access devices 105 (e.g., eNBs 105-*a* or ANCs 105-*b*) may interface with the core network 130 through backhaul links 132 (e.g., S1, S2, etc.) and may perform radio configuration and scheduling for communication with the UEs 115. In various examples, the ANCs 105-*b* may communicate, either directly or indirectly (e.g., through core network 130), with each other over backhaul links 134 (e.g., X1, X2, etc.), which may be wired or wireless communication links. Each ANC 105-*b* may also communicate with a number of UEs 115 through a number of smart radio heads (radio heads (RHs)) 105-*c*. In an alternative configuration of the wireless communication system 100, the functionality of an ANC 105-*b* may be provided by a radio head 105-*c* or distributed across the radio heads 105-*c* of an eNB 105-*a*. In another alternative configuration of the wireless communication system 100, the radio heads 105-*c* may be replaced with base stations, and the ANCs 105—may be replaced by base station controllers (or links to the core network 130). The wireless communication system 100 may also include a mix of radio heads 105-*c*, base stations, and/or other network access devices 105 for receiving/transmitting communications according to different RATs (e.g., LTE/LTE-A, 5G, Wi-Fi, etc.).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the eNBs 105-*a* and/or radio heads 105-*c* may have similar frame timing, and transmissions from different eNBs 105-*a* and/or radio heads 105-*c* may be approximately aligned in time. For asynchronous operation, the eNBs 105-*a* and/or radio heads 105-*c* may have different frame timings, and transmissions from different eNBs 105-*a* and/or radio heads 105-*c* may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a radio head 105-c, ANC 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, or the like. A UE may be able to communicate with various types of eNBs 105-a, radio heads 105-c, base stations, access points, or other network access devices, including macro eNBs, small cell eNBs, relay base stations, and the like. A UE may also be able to communicate directly with other UEs (e.g., using a peer-to-peer (P2P) protocol).

Each eNBs 105-a and/or radio heads 105-c may provide communication coverage for a respective geographic coverage area 110. The communication links 125 shown in wireless communication system 100 may include uplinks (ULs) from a UE 115 to a radio head 105-c, and/or downlinks (DLs), from a radio head 105-c to a UE 115. The downlinks may also be called forward links, while the uplinks may also be called reverse links. Control information and data may be multiplexed on an uplink or downlink according to various techniques. Control information and data may be multiplexed on an uplink or downlink, for example, using TDM techniques, FDM techniques, or hybrid TDM-FDM techniques.

One or more of the UEs 115 may include a communication manager 1415. In some examples, the communication manager 1415 may be an example of the UE Communication manager 1415 described with reference to FIG. 14. In some examples, the Communication manager 1415 may be used to generate an OFDM symbol transmission waveform and/or a SC-FDMA symbol transmission waveform using heterogeneous WOLA processing or filtering, in which a WOLA weighting length or filtering length may be different for different tones within the OFDM or SC-FDMA symbol.

One or more network devices (e.g., one or more of the radio heads 105-c, base stations, eNBs 105-a, or ANCs 105-b, or a central node (e.g., an MME) of the core network 130) may include a symbol communication manager 1515.

In some examples, the symbol communication manager 1515 may be an example of the base station symbol communication manager 1515 described with reference to FIG. 15. In some examples, the symbol communication manager 1515 may be used to generate an OFDM symbol transmission waveform and/or a SC-FDMA symbol transmission waveform using heterogeneous WOLA processing or filtering, in which a WOLA weighting length or filtering length may be different for different tones within the OFDM or SC-FDMA symbol.

Each communication link 125 may include one or more carriers, where each carrier may be a signal made up of multiple subcarriers (e.g., waveform signals of different frequencies) modulated according to one or more radio access technologies. Each modulated signal may be sent on a different subcarrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing techniques (e.g., using unpaired spectrum resources). Frame structures for FDD (e.g., frame structure type 1) and TDD (e.g., frame structure type 2) may be defined.

In some examples of the wireless communication system 100, the radio heads 105-c and/or UEs 115 may include multiple antennas for employing antenna diversity schemes to improve communication quality and reliability between radio heads 105-c and UEs 115. Additionally or alternatively, radio heads 105-c and/or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2:
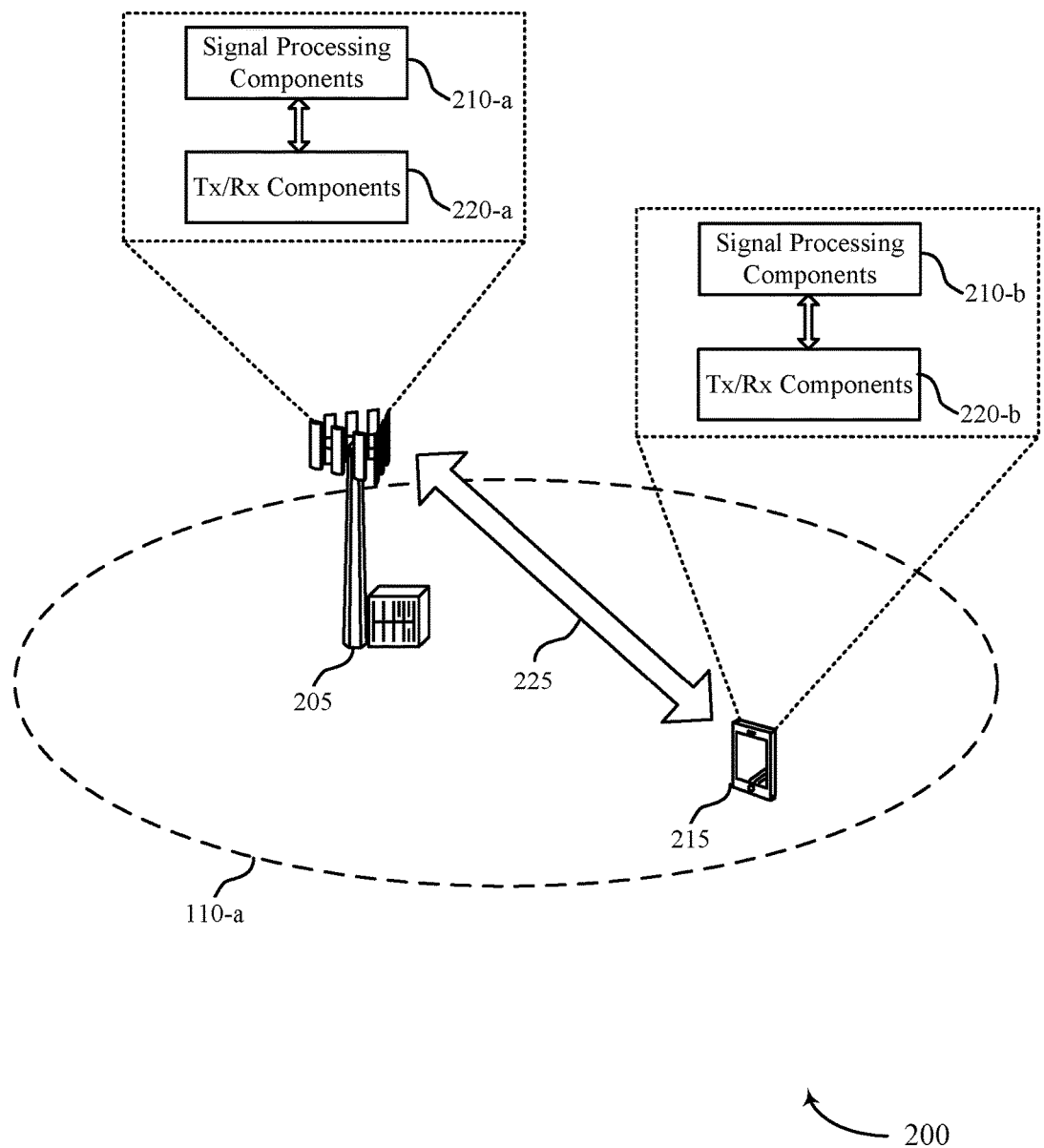
FIG. 2 illustrates an example of a wireless communications system for heterogeneous weighted overlap-add (WOLA) windowing and filtering for orthogonal frequency division multiplexing (OFDM) waveforms, in accordance with aspects of the present disclosure.

FIG. 2 illustrates an example of a wireless communications system 200 for heterogeneous WOLA windowing or heterogeneous filtering for OFDM and/or SC-FDMA waveforms, in accordance with aspects of the present disclosure. Wireless communications system 200 may include a UE 215, which may be examples of a UE 115 of FIG. 1, and base station 205, which may be an example of one or more of the radio heads 105-c, eNBs 105-a, or ANCs 105-b described with reference to FIG. 1. UE 215 and base station 205 may communicate using one or several carriers 225 (including one or more eCCs). In some examples, symbols may be processed by signal processing components 210 and may be transmitted/received by transmission/receive components 220.

In some examples, the signal processing components 210-a of base station 205 may divide a symbol into two or more subsets of tones and process the different subsets using one or more different processing parameters, such as different types of WOLA weighting windows, which may include different weights and WOLA weighting lengths. In some examples, the different processing parameters may include different bandpass filtering lengths. In examples that use WOLA techniques for OOB suppression, subsets of tones associated with a head portion or a tail portion (e.g., edge tones) of a symbol may be processed with a relatively long WOLA weighting length, and a subset of tones associated with a center portion of the symbol may be processed with a relatively short WOLA weighting length. The processing components may process the different subsets of tones separately, and the different subsets of tones of the symbol may be overlapped to form a transmission waveform for the symbol, which may be overlapped and added with adjacent symbol transmission waveforms and transmitted using transmission/receive components 220-a. When receiving a waveform, the processing components may perform similar processes and apply the different types of WOLA weighting windows to extract the different subsets of tones.

In examples that use transmission filtering using a bandpass filter for OOB suppression, signal processing components 210-a of base station 205 may divide tones of a symbol into subsets of tones associated with a head portion or a tail portion of the symbol and may process these subsets of tones with a relatively long filter length (e.g., a relatively large number of samples or taps at a finite impulse response (FIR) filter). The signal processing components 210-a also may divide the tones of the symbol into a subset of tones associated with a center portion of the symbol, and may process these tones with a relatively short filter length. Such heterogeneous processing of tones within a symbol may provide enhanced spectral shape for OOB suppression at transmission edges, and also provide reduced ISI for the center tones of the symbol. The different portions of the symbol may be overlapped to form a transmission waveform for the symbol, and transmitted using transmission/receive components 220-a. In some examples a CP may be added to the symbol transmission, and the signal processing components 210-a may process the transmission waveform for the symbol to be overlapped and added with adjacent symbol transmission waveforms. In certain examples, such a CP may simply be replaced by a guard interval, and the different portions of the symbol may be added to form the symbol transmission waveform which may simply be concatenated with other symbol transmission waveforms and transmitted using transmission/receive components 220-a. When receiving a waveform, the processing components may perform similar processes and apply the different types of filtering windows to extract the different subsets of tones.

While the above examples were discussed with respect to signal processing components 210-a and transmission/receive components 220-a of base station 205, such techniques may also be employed by signal processing components 210-b and transmission/receive components 220-b of UE 215. Furthermore, in some examples UE 215 may transmit uplink transmissions using SC-FDMA (or other multiple access technologies), and the WOLA weighting or bandpass filtering techniques described herein may be applied to such uplink symbols that are transmitted from UE 215.

Figure 3:
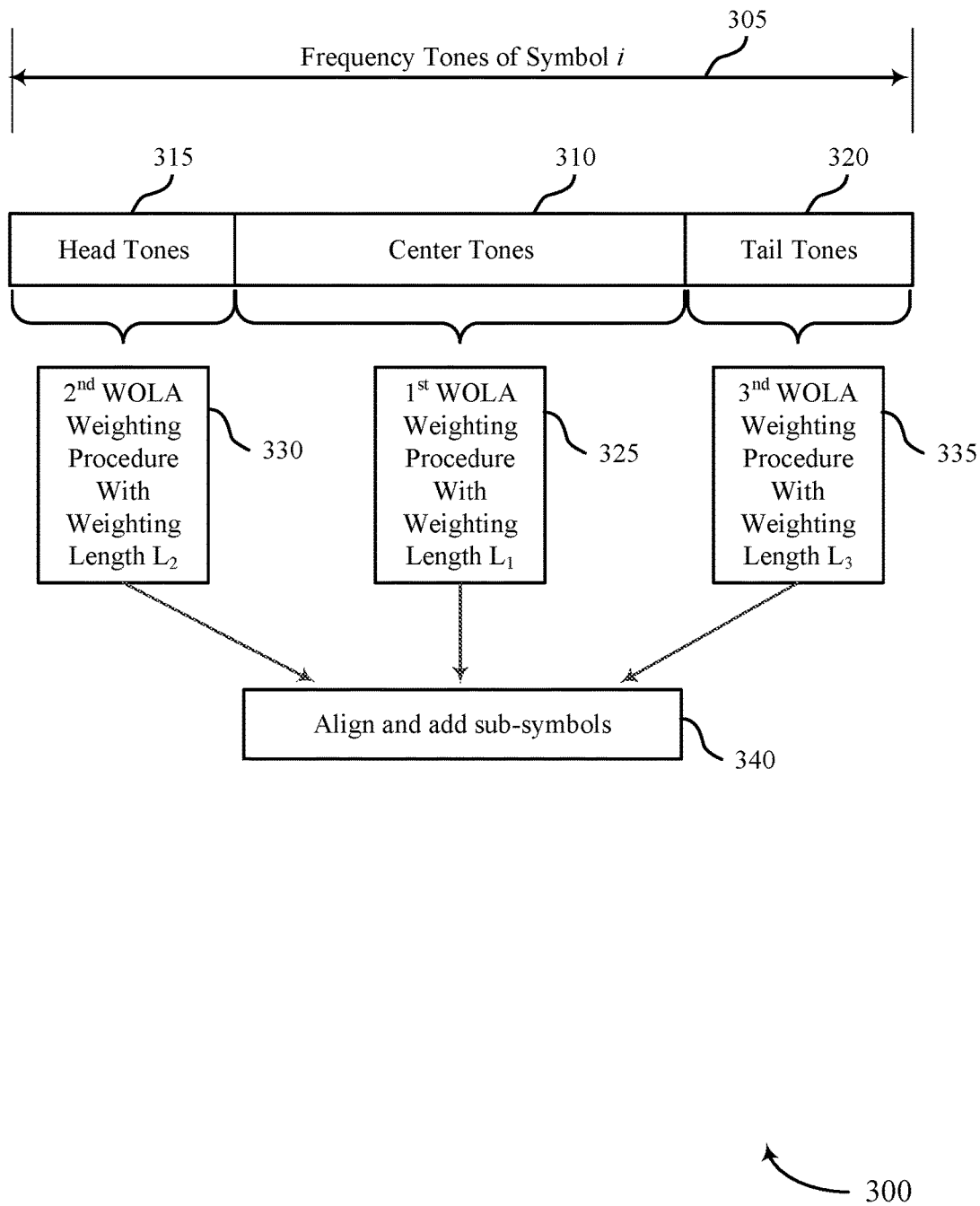
FIG. 3 illustrates an example of heterogeneous WOLA processing of an OFDM symbol in accordance with aspects of the present disclosure.

FIG. 3 illustrates an example of heterogeneous WOLA processing of a symbol 300 in accordance with aspects of the present disclosure. In some cases, example of heterogeneous WOLA processing of a symbol 300 may represent aspects of techniques performed by a UE, base station, radio head, eNB, or ANC as described with reference to FIGS. 1-2.

In the example of FIG. 3, a symbol 305 may have a number of frequency tones in the frequency domain. The tones of symbol 305 may be divided up into a first subset of tones 310 corresponding to center tones of the symbol, a second subset of tones corresponding to head tones 315 of the symbol, and a third subset of tones corresponding to tail tones 320 of the symbol. Each of the subsets of tones 310-320 may be WOLA processed separately. In this example, the first subset of center tones 310 may be processed with a first WOLA weighting procedure 325 with a weighting length $L_1$. The second subset of head tones 315 may be processed with a second WOLA weighting procedure 330 with a weighting length $L_2$. Similarly, the third subset of tail tones 320 may be processed with a third WOLA weighting procedure 335 with a weighting length $L_3$. In some examples, the side bands corresponding to head tones 315 and tail tones 320 may be processed with a relatively long WOLA weighting length to help reduce the ICI effect and improve OOB suppression. Further, the center band corresponding to center tones 310 may be processed with a relatively short WOLA weighting length to reduce the ISI effect. In some examples, the different subsets of tones 310-320, or sub-symbols, may be aligned and added 340, and may then be overlapped and added with adjacent symbols.

While three subsets tones 310-320 are illustrated in FIG. 3, other examples may include only two subsets of tones, such as for tones corresponding to head tones 315 and center tones 310. As indicated above, in some examples, the weighting length $L_2$ and the weighting length $L_3$ may be the same length, and be longer than weighting length $L_1$. In other examples, $L_2$ and $L_3$ may be different, and selected based on a particular type of symbol that is adjacent to the symbol 305 (e.g., a symbol of a same service or different service than symbol 305). In some examples, $L_2$ and $L_3$ may correspond to approximately 5% of the length of symbol 305, and the length $L_1$ may correspond to approximately 1% to 2% of the length of symbol 305. Of course, these values are examples for the purposes of illustration and discussion only, and other values for the different weighting lengths may be based and may be selected based on particular applications, network operating conditions, traffic being transmitted, and the like.

Figure 4A:
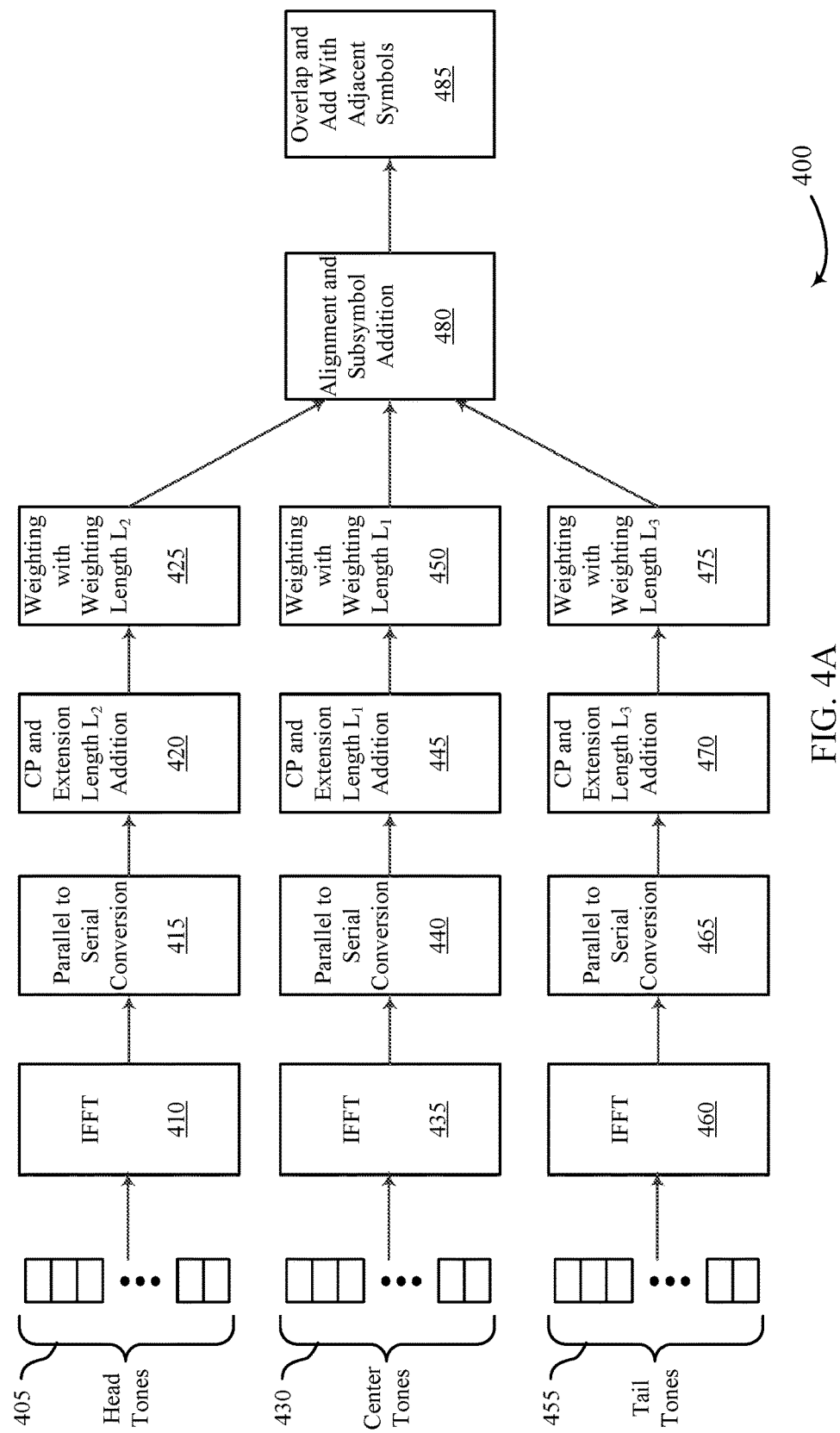
FIG. 4A illustrates an example of transmit processing chains for heterogeneous WOLA windowing for OFDM waveforms in accordance with aspects of the present disclosure.

FIG. 4A illustrates an example of transmit processing chains 400 for heterogeneous WOLA windowing and filtering for OFDM waveforms. In some cases, processing chains 400 may represent aspects of techniques performed by a UE or base station as described with reference to FIGS. 1-2.

As discussed above, various examples may divide tones of an OFDM symbols into two or more subsets of tones, and each subset of tones may be processed separately for WOLA weighting. In the example of FIG. 4A, head tones 405 may include a subset of tones at the head, or beginning, of an OFDM symbol. The head tones 405 may be provided to IFFT 410 that may generate a number of samples corresponding to head tones 405, which may be provided to a parallel to serial conversion 415 function to generate a series of time samples corresponding to head tones 405. A CP and extension with length $L_2$ may be added to the time samples at 420, and a weighting function 425 performed with a weighting length $L_2$ that corresponds to extension length $L_2$.

Similarly, center tones 430 may include a subset of tones around the center of the OFDM symbol. The center tones 430 may be provided to IFFT 435 that may generate a number of samples corresponding to center tones 430, which may be provided to a parallel to serial conversion 440 function to generate a series of time samples corresponding to center tones 430. A CP and extension with length $L_1$ may be added to the time samples at 445, and a weighting function 450 performed with a weighting length $L_1$ that corresponds to extension length $L_1$.

Likewise, tail tones 455 may include a subset of tones at the tail, or end, of the OFDM symbol. The tail tones 455 may be provided to IFFT 460 that may generate a number of samples corresponding to tail tones 455, which may be provided to a parallel to serial conversion 465 function to generate a series of time samples corresponding to tail tones 455. A CP and extension with length $L_3$ may be added to the time samples at 470, and a weighting function 475 performed with a weighting length $L_3$ that corresponds to extension length $L_3$.

Each of the weighted sub-symbols may be provided to alignment and sub-symbol addition function 480 that may assemble the weighted sub-symbols to provide a transmission waveform for the OFDM symbol. The transmission waveform may be provided to overlap and add function 485 to provide an overlapped and added waveform with adjacent symbols, that may then be transmitted by a transmitter.

As discussed above, in some examples the weighting length $L_1$ may be selected to be shorter than the weighting length $L_2$, which may provide reduced ISI effects at the center tones 430, and reduced ICI effects and improved OOB suppression for head tones 405 and tail tones 455. In some examples, the lengths $L_2$ and $L_3$ may be the same length, in which case the processing for both the head tones 405 and the tail tones 455 may be performed in the same processing chain.

Figure 4B:
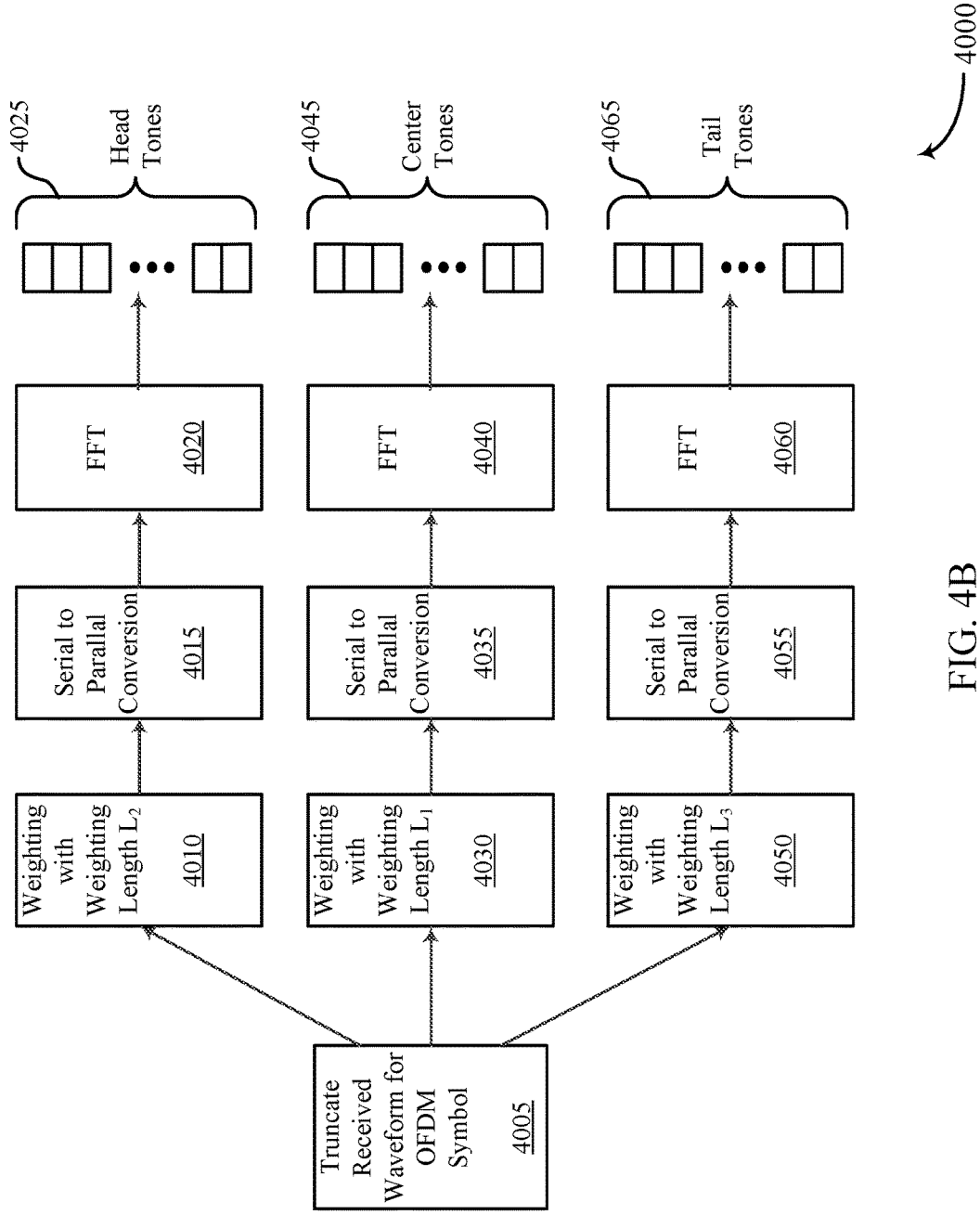
FIG. 4B illustrates an example of receive processing chains for heterogeneous WOLA windowing for OFDM waveforms in accordance with aspects of the present disclosure.

FIG. 4B illustrates an example of receive processing chains 4000 for heterogeneous WOLA windowing and filtering for OFDM waveforms. In some cases, processing chains 4000 may represent aspects of techniques performed by a UE or base station as described with reference to FIGS. 1-2.

As discussed above, various examples may divide tones of an OFDM symbols into two or more subsets of tones, and each subset of tones may be processed separately for WOLA weighting. In the example of FIG. 4B, a receiver may receive an OFDM symbol waveform, and may truncate the received waveform for the OFDM symbol at 4005. Processing for head tones 4025 include weighting the received waveform at a weighting function 4010 performed with a weighting length $L_2$ that corresponds to extension length $L_2$. The weighted samples may be provided to a serial to parallel conversion 4015 function, and provided to fast Fourier transform (FFT) 4020, that may output the head tones 4025.

Similarly, center tones 4045 may include a subset of tones around the center of the OFDM symbol. The center tones 4045 processing may include weighting the received waveform at a weighting function 4030 performed with a weighting length $L_1$ that corresponds to extension length $L_1$. The weighted samples may be provided to a serial to parallel conversion 4035 function, and provided to FFT 4040, that may output the center tones 4045.

Likewise, tail tones 4065 may include a subset of tones at the tail, or end, of the OFDM symbol. The tail tones 4065 processing may include weighting the received waveform at a weighting function 4050 performed with a weighting length $L_3$ that corresponds to extension length $L_3$. The weighted samples may be provided to a serial to parallel conversion 4055 function, and provided to FFT 4060, that may output the tail tones 4065.

As discussed above, in some examples the weighting length $L_1$ may be selected to be shorter than the weighting length $L_2$, which may provide reduced ISI effects at the center tones 430, and reduced ICI effects and improved OOB suppression for head tones 405 and tail tones 455.

Figure 5A:
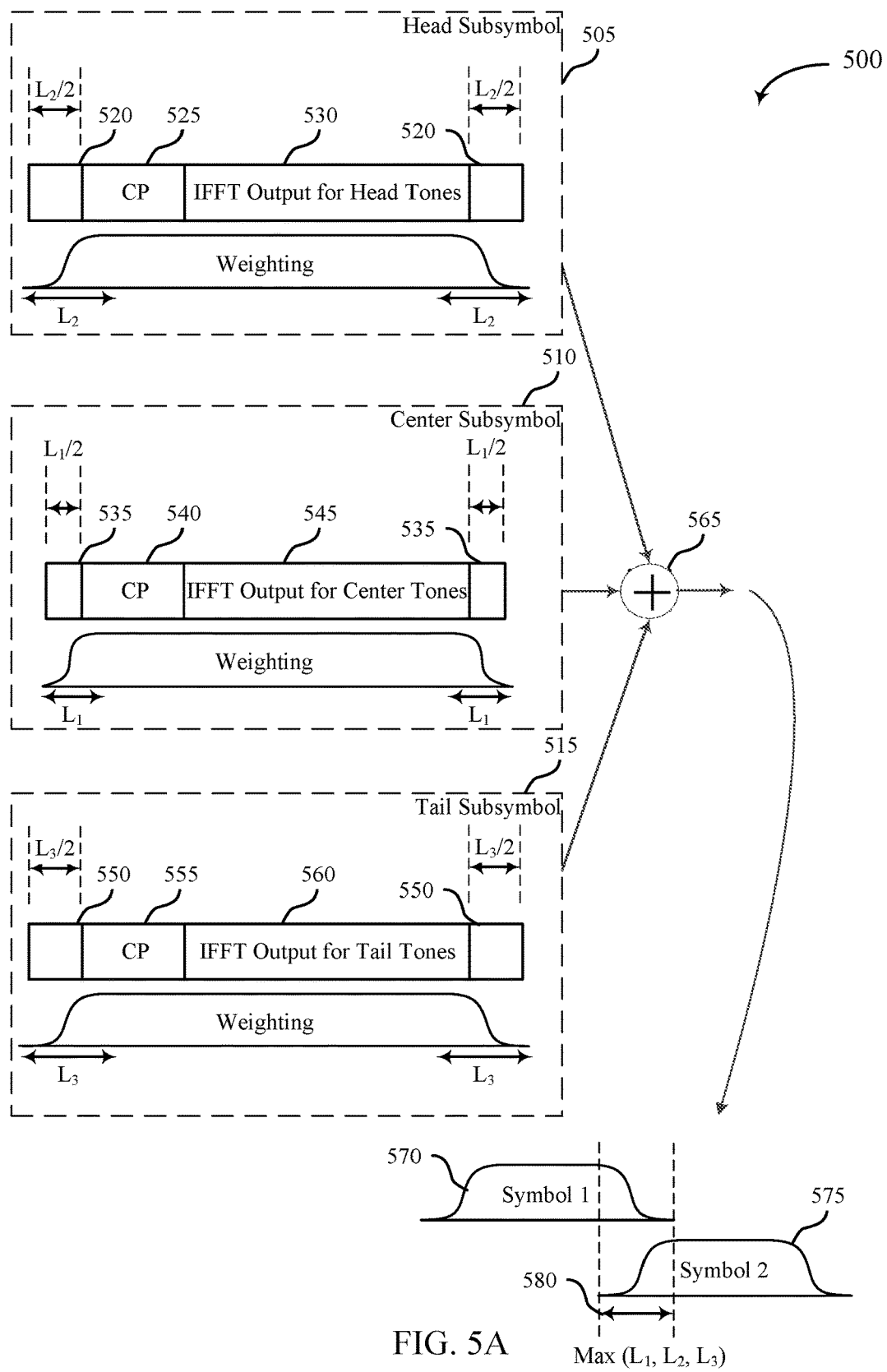
FIG. 5A illustrates an example of transmit sub-symbol processing and symbol overlapping for heterogeneous WOLA windowing for OFDM waveforms in accordance with aspects of the present disclosure.

FIG. 5A illustrates an example of transmit sub-symbol processing and symbol overlapping 500 for heterogeneous WOLA windowing for OFDM waveforms. In some cases, sub-symbol processing and symbol overlapping 500 may represent aspects of techniques performed by a UE or base station as described with reference to FIGS. 1-2.

In the example of FIG. 5A, head sub-symbol 505 may be weighted using a WOLA weighting length $L_2$, as discussed above with respect to FIG. 4. In this example, an extension length $L_2$ may be added as $L_2/2$ 520 before a CP 525 and after IFFT output 530 for head tones. Similarly, center sub-symbol 510 may be weighted using a WOLA weighting length $L_1$, as discussed above with respect to FIG. 4. In this example, an extension length $L_1$ may be added as $L_1/2$ 535 before CP 540 and after IFFT output 545 for center tones. Finally, tail sub-symbol 515 may be weighted using a WOLA weighting length $L_3$, as discussed above with respect to FIG. 4. In this example, an extension length $L_3$ may be added as $L_3/2$ 550 before CP 555 and after IFFT output 560 for tail tones.

Each of the sub-symbol 505-515 waveforms may be combined at combiner 565, which may align and add the sub-symbols 505-515 to provide a symbol waveform such as waveform 570 for symbol 1. The waveform from combiner 565 may be overlapped and added with an adjacent waveform 575 for symbol 2, in this example, with the resultant overlapped and added waveform transmitted to a receiver. The amount of overlap 580 for waveform 570 and waveform 575 may correspond to $\text{Max}(L_1, L_2, L_3)$.

Figure 5B:
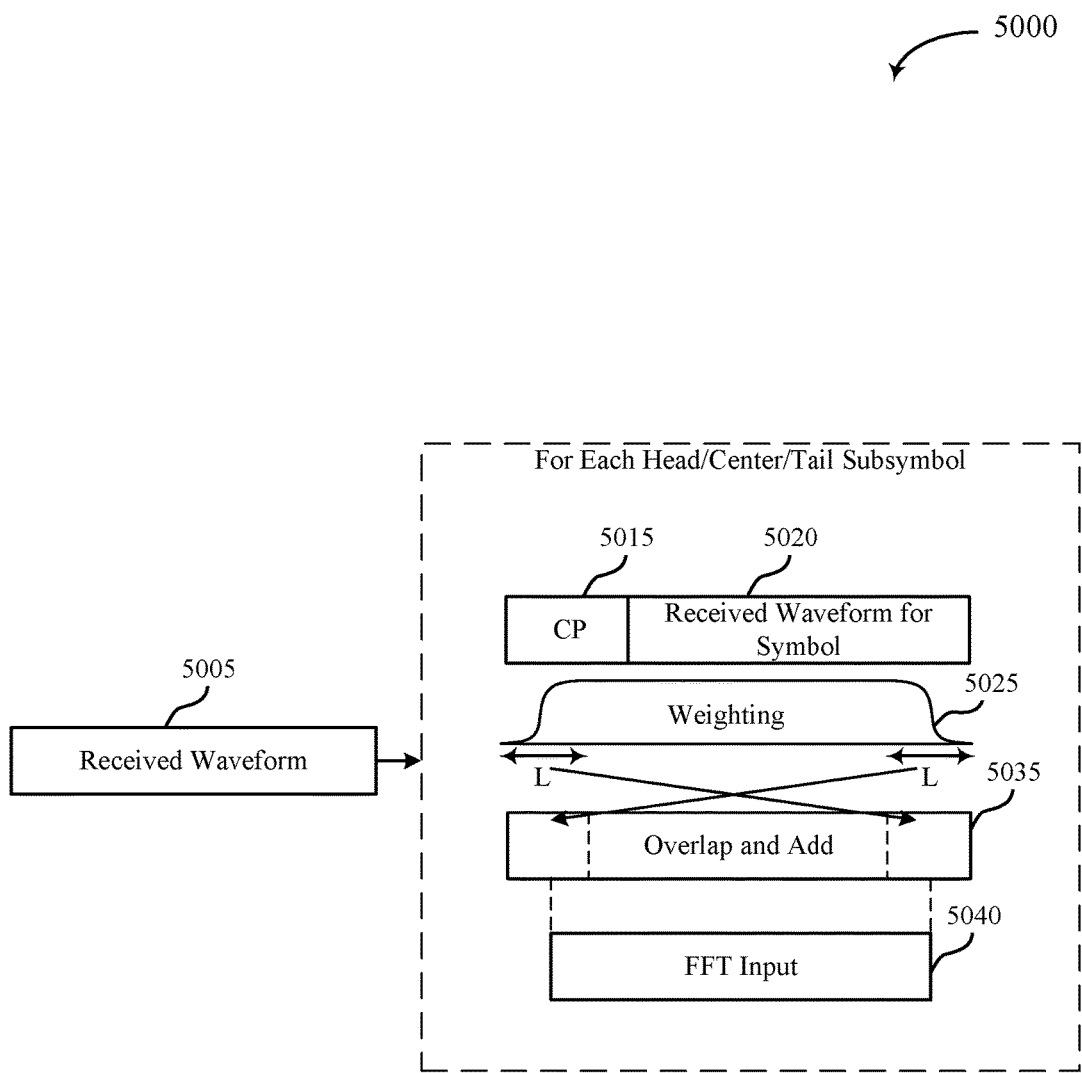
FIG. 5B illustrates an example of receive sub-symbol processing and symbol overlapping for heterogeneous WOLA windowing for OFDM waveforms in accordance with aspects of the present disclosure.

FIG. 5B illustrates an example of receive sub-symbol processing and symbol overlapping 5000 for heterogeneous WOLA windowing for OFDM waveforms. In some cases, sub-symbol processing and symbol overlapping 5000 may represent aspects of techniques performed by a UE or base station as described with reference to FIGS. 1-2.

In the example of FIG. 5B, a received waveform may be processed differently for each subset of tones. More specifically, if three subsets of tones are transmitted, receive processing for each of the subsets may be performed based on the transmission parameters for each subset. For example, a head sub-symbol and a tail sub-symbol may be weighted using a first type of WOLA weighting window, and a center sub-symbol may be weighted using a second type of WOLA weighting window. In each case, the received waveform 5005, which may include a CP 5015 and a received waveform for an OFDM symbol 5020, may be processed with a WOLA weighting window 5025, that may have a weighting length L associated with the particular subset of tones. The weightings for the weighting windows L may be overlapped and added to obtain a weighted waveform 5035, which may then be provided to a FFT input 5040 to generate the associated sub-symbol or subset of tones.

Figure 6:
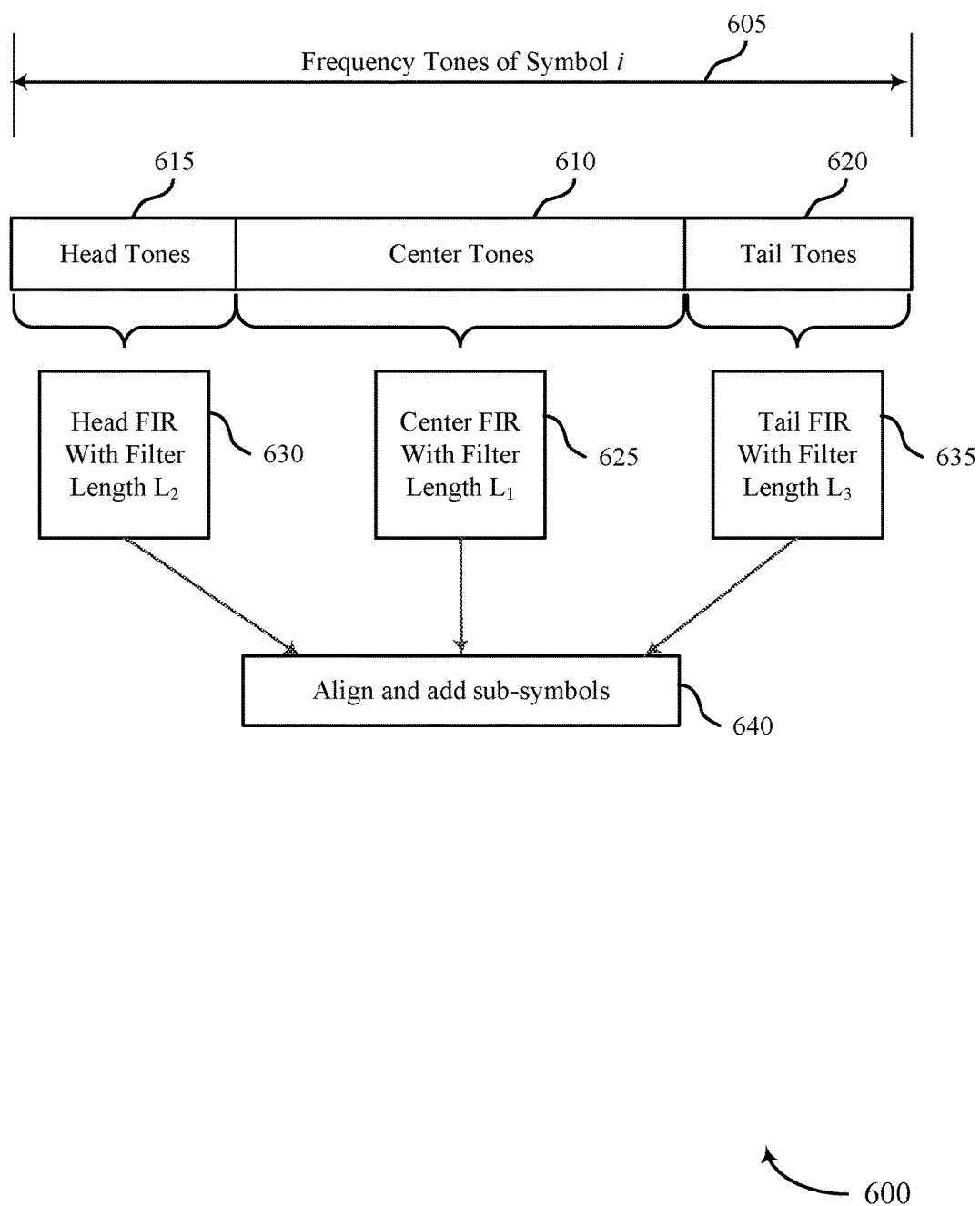
FIG. 6 illustrates an example of heterogeneous transmission filtering of an OFDM symbol in accordance with aspects of the present disclosure.

FIG. 6 illustrates an example of heterogeneous transmission filtering 600 of an OFDM symbol. In some cases, heterogeneous transmission filtering 600 may represent aspects of techniques performed by a UE or base station as described with reference to FIGS. 1-2.

In the example of FIG. 6, an OFDM symbol 605 may have a number of frequency tones in the frequency domain. The tones of OFDM symbol 605 may be divided up into a first subset of tones 610 corresponding to center tones of the OFDM symbol, a second subset of tones corresponding to head tones 615 of the OFDM symbol, and a third subset of tones corresponding to tail tones 620 of the OFDM symbol. Each of the subsets of tones 610-620 may be filtered separately. In this example, the first subset of center tones 610 may be filtered with a first filtering procedure 625 with a filter length $L_1$. The second subset of head tones 615 may be filtered with a second filtering procedure 630 with a filter length $L_2$. Similarly, the third subset of tail tones 620 may be filtered with a third filtering procedure 635 with a filter length $L_3$. In some examples, the side bands corresponding to head tones 615 and tail tones 620 may be processed with a relatively long filter lengths to help reduce the ICI effect and improve OOB suppression. Further, the center band corresponding to center tones 610 may be processed with a relatively short filter length to reduce the ISI effect. In some examples, the different subsets of tones 610-620, or sub-symbols, may be aligned and added 640, and may then be overlapped and added with adjacent symbols.

While three subsets tones 610-620 are illustrated in FIG. 6, other examples may include only two subsets of tones, such as for tones corresponding to head tones 615 and center tones 610. As indicated above, in some examples, the filter length $L_2$ and the filter length $L_3$ may be the same length, and be longer than filter length $L_1$. In other examples, $L_2$ and $L_3$ may be different, and selected based on a particular type of symbol that is adjacent to the symbol 605 (e.g., a symbol of a same service or different service than symbol 605). In some examples, $L_2$ and $L_3$ may correspond to approximately 5% of the length of symbol 605, and the length $L_1$ may correspond to approximately 1% to 2% of the length of symbol 605. Of course, these values are examples for the purposes of illustration and discussion only, and other values for the different weighting lengths may be based and may be selected based on particular applications, network operating conditions, traffic being transmitted, and the like.

Figure 7A:
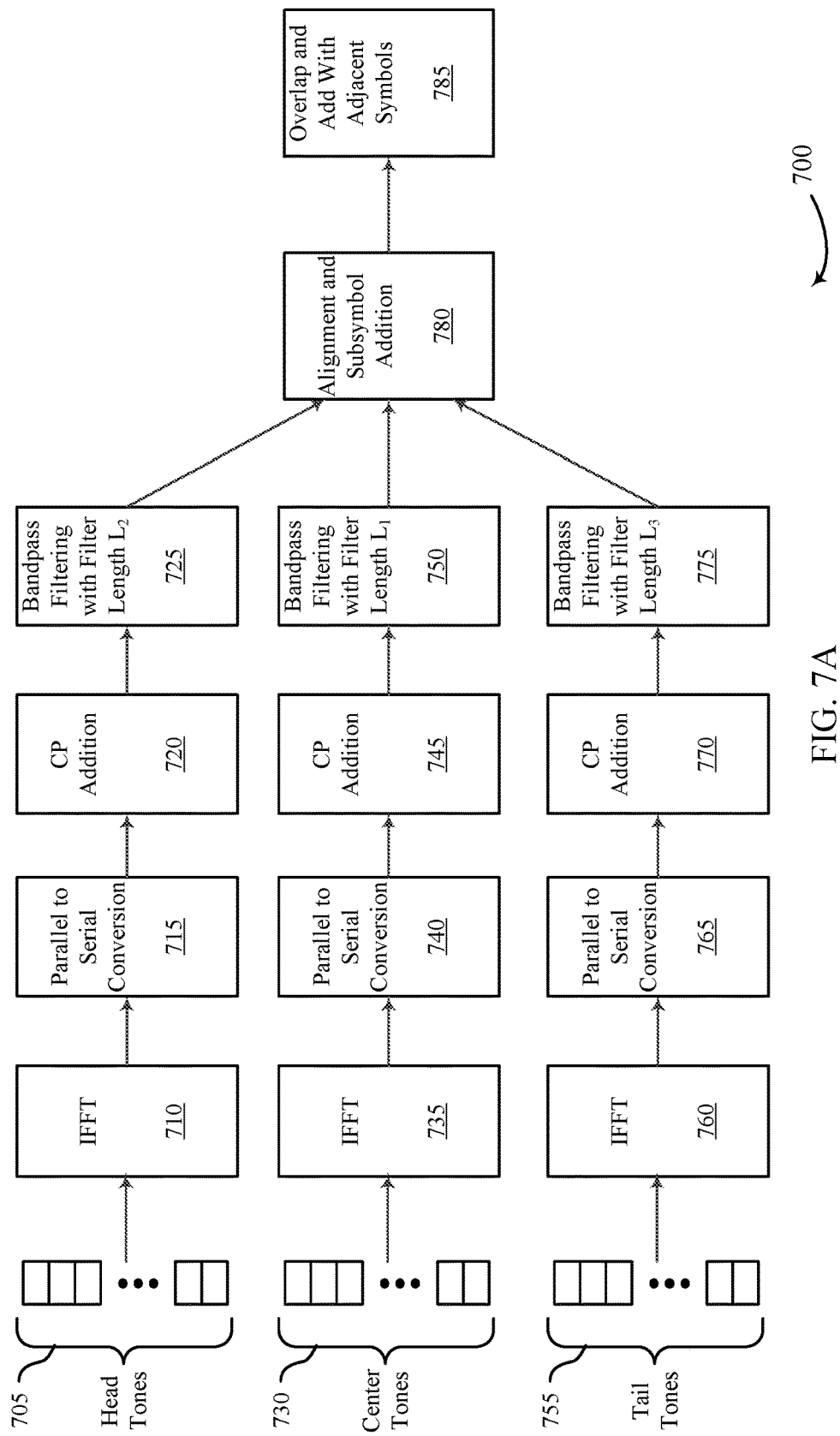
FIG. 7A illustrates an example of transmit processing chains for heterogeneous transmission filtering for OFDM waveforms in accordance with aspects of the present disclosure.

FIG. 7A illustrates an example of transmit processing chains 700 for heterogeneous transmission filtering for OFDM waveforms. In some cases, processing chains 700 may represent aspects of techniques performed by a UE or base station as described with reference to FIGS. 1-2.

As discussed above, various examples may divide tones of an OFDM symbols into two or more subsets of tones, and in some examples each subset of tones may be filtered separately. In the example of FIG. 7, head tones 705 may include a subset of tones at the head, or beginning, of an OFDM symbol. The head tones 705 may be provided to IFFT 710 that may generate a number of samples corresponding to head tones 705, which may be provided to a parallel to serial conversion 715 function to generate a series of time samples corresponding to head tones 705. A CP may be added to the time samples at 720, and the CP and time samples may be filtered with a filter length $L_2$ at bandpass filter 725.

Similarly, center tones 730 may include a subset of tones around the center of the OFDM symbol. The center tones 730 may be provided to IFFT 735 that may generate a number of samples corresponding to center tones 730, which may be provided to a parallel to serial conversion 740 function to generate a series of time samples corresponding to center tones 730. A CP may be added to the time samples at 745, and the CP and time samples may be filtered with a filter length $L_1$ at bandpass filter 750.

Likewise, tail tones 755 may include a subset of tones at the tail, or end, of the OFDM symbol. The tail tones 755 may be provided to IFFT 760 that may generate a number of samples corresponding to tail tones 755, which may be provided to a parallel to serial conversion 765 function to generate a series of time samples corresponding to tail tones 755. A CP may be added to the time samples at 770, and the CP and time samples may be filtered with a filter length $L_3$ at bandpass filter 725.

Each of the filtered sub-symbols may be provided to alignment and sub-symbol addition function 780 that may assemble the filtered sub-symbols to provide a transmission waveform for the OFDM symbol. The transmission waveform may be provided to overlap and add function 785 to provide an overlapped and added waveform with adjacent symbols, that may then be transmitted by a transmitter.

As discussed above, in some examples the filter length $L_1$ may be selected to be shorter than the filter length $L_2$, which may provide reduced ISI effects at the center tones 730, and reduced ICI effects and improved OOB suppression for head tones 705 and tail tones 755. In some examples, the lengths $L_1$ and $L_2$ may be the same length, in which case the processing for both the head tones 705 and the tail tones 755 may be performed in the same processing chain.

Figure 7B:
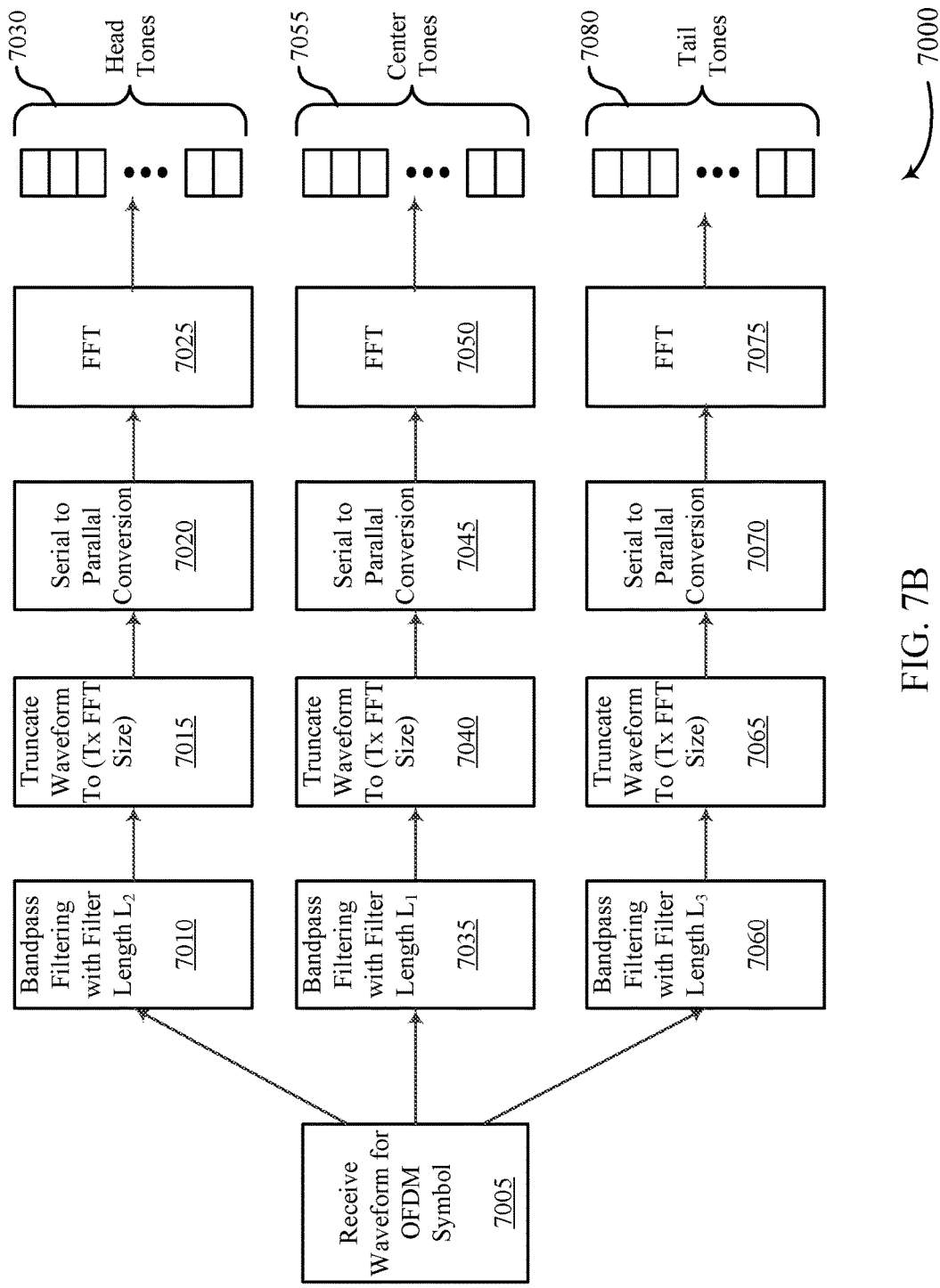
FIG. 7B illustrates an example of receive processing chains for heterogeneous transmission filtering for OFDM waveforms in accordance with aspects of the present disclosure.

FIG. 7B illustrates an example of receive processing chains 7000 for heterogeneous transmission filtering for OFDM waveforms. In some cases, processing chains 700 may represent aspects of techniques performed by a UE or base station as described with reference to FIGS. 1-2.

As discussed above, various examples may divide tones of an OFDM symbols into two or more subsets of tones, and in some examples each subset of tones may be filtered separately. In the example of FIG. 7B, head tones 7030 may include a subset of tones at the head, or beginning, of an OFDM symbol. In the example of FIG. 7B, a receiver may receive an OFDM symbol waveform at 7005. Processing for head tones 7030 include bandpass filtering the received waveform at a filtering function 7010 performed with a filter length $L_2$. The filtered samples may be truncated to a size corresponding to the transmit FFT size at truncation function 7015, with the truncated waveform provided to a serial to parallel conversion 7020 function, and provided to FFT 7025, that may output the head tones 7030.

Similarly, center tones 7055 may include a subset of tones around the center of the OFDM symbol. The center tones 7055 processing may include bandpass filtering the received waveform at a filtering function 7035 performed with a filter length $L_1$. The filtered samples may be truncated to a size corresponding to the transmit FFT size at truncation function 7040, with the truncated waveform provided to a serial to parallel conversion 7045 function, and provided to FFT 7050, that may output the center tones 7055.

Likewise, tail tones 7080 may include a subset of tones at the tail, or end, of the OFDM symbol. The tail tones 7080 processing may include bandpass filtering the received waveform at a filtering function 7060 performed with a filter length $L_3$. The filtered samples may be truncated to a size corresponding to the transmit FFT size at truncation function 7065, with the truncated waveform provided to a serial to parallel conversion 7070 function, and provided to FFT 7075, that may output the tail tones 7080.

As discussed above, in some examples the filter length $L_1$ may be selected to be shorter than the filter length $L_2$, which may provide reduced ISI effects at the center tones 7055, and reduced ICI effects and improved OOB suppression for head tones 7030 and tail tones 7080.

Figure 8:
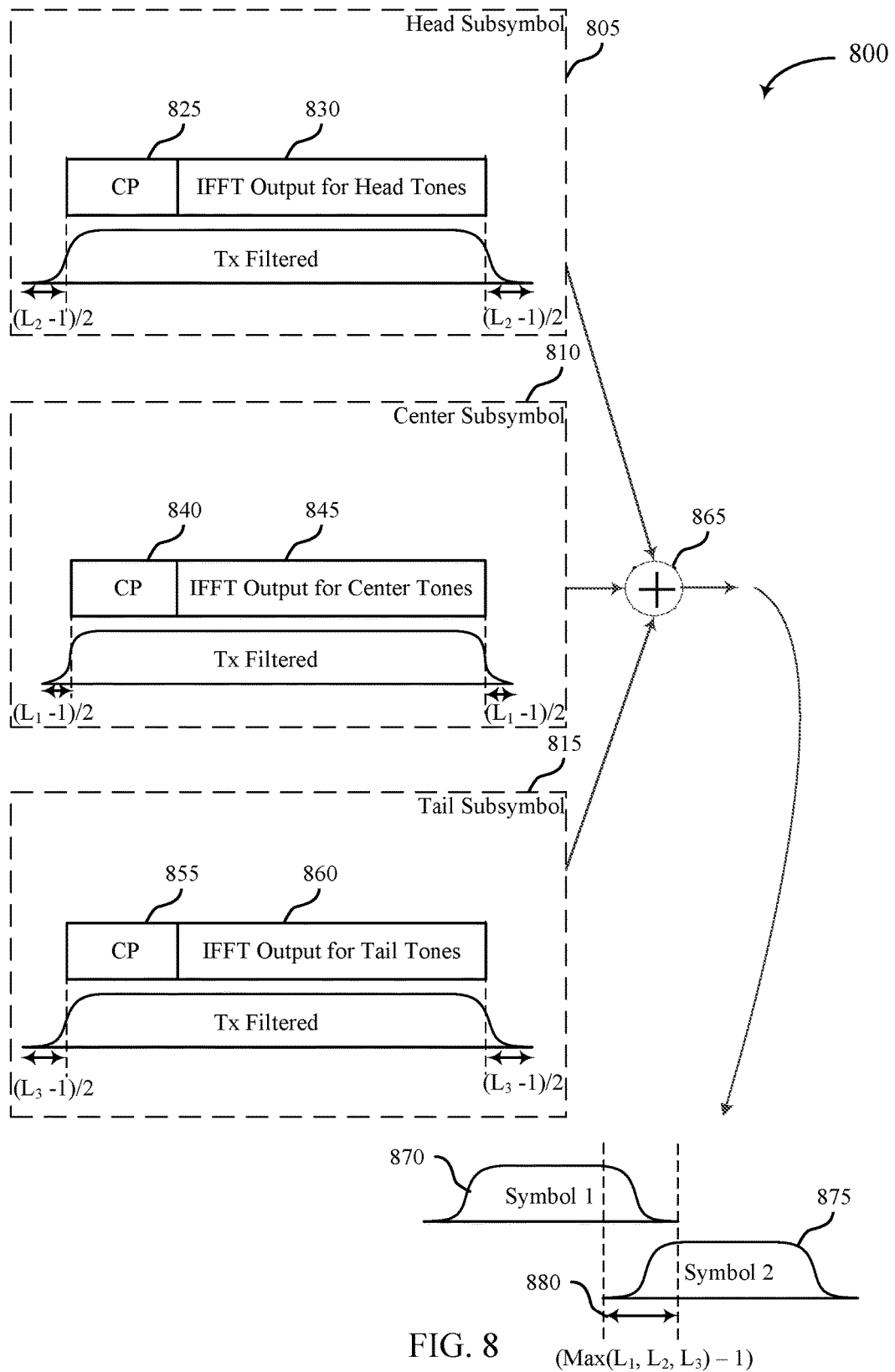
FIG. 8 illustrates an example of sub-symbol processing and symbol overlapping for heterogeneous transmission filtering for OFDM waveforms in accordance with aspects of the present disclosure.

FIG. 8 illustrates an example of sub-symbol processing and symbol overlapping 800 for heterogeneous transmission filtering for OFDM waveforms. In some cases, sub-symbol processing and symbol overlapping 800 may represent aspects of techniques performed by a UE or base station as described with reference to FIGS. 1-2.

In the example of FIG. 8, head sub-symbol 805 may be filtered using a filter length $L_2$, as discussed above with respect to FIG. 7. In this example, filtering may begin at $(L_2-1)/2$ before a CP 825 and end at $(L_2-1)/2$ after IFFT output 830 for head tones. Similarly, center sub-symbol 810 may be filtered using a filter length $L_1$, as discussed above with respect to FIG. 4. In this example, filtering may begin at $(L_1-1)/2$ before a CP 840 and end at $(L_1-1)/2$ after IFFT output 845 for center tones. Finally, tail sub-symbol 815 may be filtered using a filter length $L_3$, as discussed above with respect to FIG. 7. In this example, filtering may begin at $(L_3-1)/2$ before a CP 855 and end at $(L_3-1)/2$ after IFFT output 860 for tail tones.

Each of the sub-symbol 805-815 waveforms may be combined at combiner 865, which may align and add the sub-symbols 805-815 to provide a symbol waveform such as waveform 870 for symbol 1. The waveform from combiner 865 may be overlapped and added with an adjacent waveform 875 for symbol 2, in this example, with the resultant overlapped and added waveform transmitted to a receiver. The amount of overlap 880 for waveform 870 and waveform 875 may correspond to $(Max(L_1, L_2, L_3)-1)$.

Figure 9A:
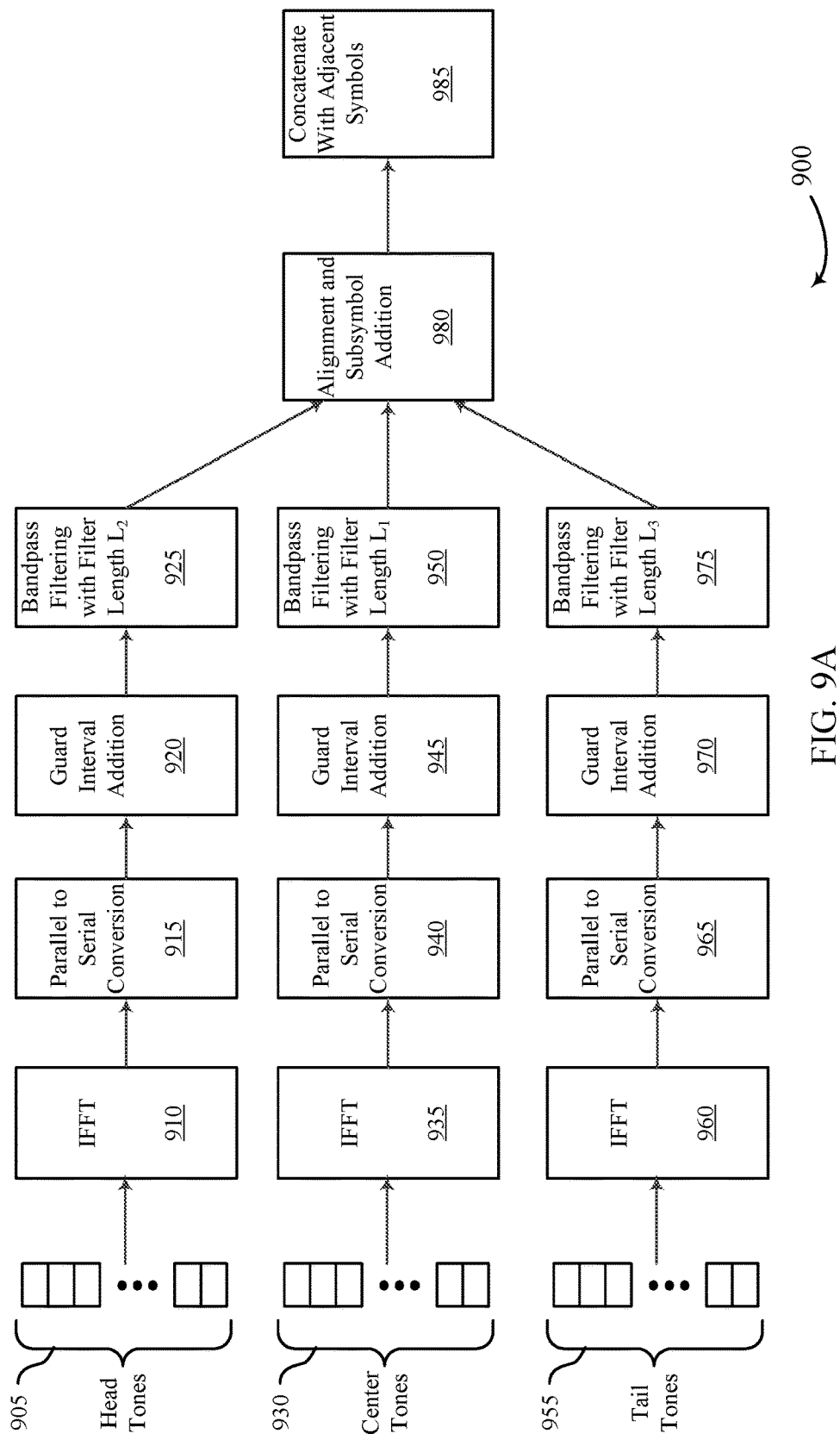
FIG. 9A illustrates an example of transmit processing chains for heterogeneous transmission filtering for OFDM waveforms with guard intervals in accordance with aspects of the present disclosure.

FIG. 9A illustrates an example of transmit processing chains 900 for heterogeneous transmission filtering for OFDM waveforms with guard intervals. In some cases, processing chains 900 may represent aspects of techniques performed by a UE or base station as described with reference to FIGS. 1-2.

As discussed above, again various examples may divide tones of an OFDM symbols into two or more subsets of tones, and in some examples each subset of tones may be filtered separately. In the example of FIG. 9A, head tones 905 may include a subset of tones at the head, or beginning, of an OFDM symbol. The head tones 905 may be provided to IFFT 910 that may generate a number of samples corresponding to head tones 905, which may be provided to a parallel to serial conversion 915 function to generate a series of time samples corresponding to head tones 905. A guard interval may be added to the time samples at 920, and guard interval and time samples may be filtered with a filter length $L_2$ at bandpass filter 925. In some examples, the guard interval may be a zero power guard interval where no power is used in the transmissions for the period of the guard interval.

Similarly, center tones 930 may include a subset of tones around the center of the OFDM symbol. The center tones 930 may be provided to IFFT 935 that may generate a number of samples corresponding to center tones 930, which may be provided to a parallel to serial conversion 940 function to generate a series of time samples corresponding to center tones 930. A guard interval may be added to the time samples at 945, and the guard interval and time samples may be filtered with a filter length $L_1$ at bandpass filter 950.

Likewise, tail tones 955 may include a subset of tones at the tail, or end, of the OFDM symbol. The tail tones 955 may be provided to IFFT 960 that may generate a number of samples corresponding to tail tones 955, which may be provided to a parallel to serial conversion 965 function to generate a series of time samples corresponding to tail tones 955. A guard interval may be added to the time samples at 970, and the guard interval and time samples may be filtered with a filter length $L_3$ at bandpass filter 925.

Each of the filtered sub-symbols may be provided to alignment and sub-symbol addition function 980 that may assemble the filtered sub-symbols to provide a transmission waveform for the OFDM symbol. The transmission waveform may be concatenated at 985 with adjacent symbols and may be transmitted by a transmitter.

As discussed above, in some examples the filter length $L_1$ may be selected to be shorter than the filter length $L_2$, which may provide reduced ISI effects at the center tones 930, and reduced ICI effects and improved OOB suppression for head tones 905 and tail tones 955.

Figure 9B:
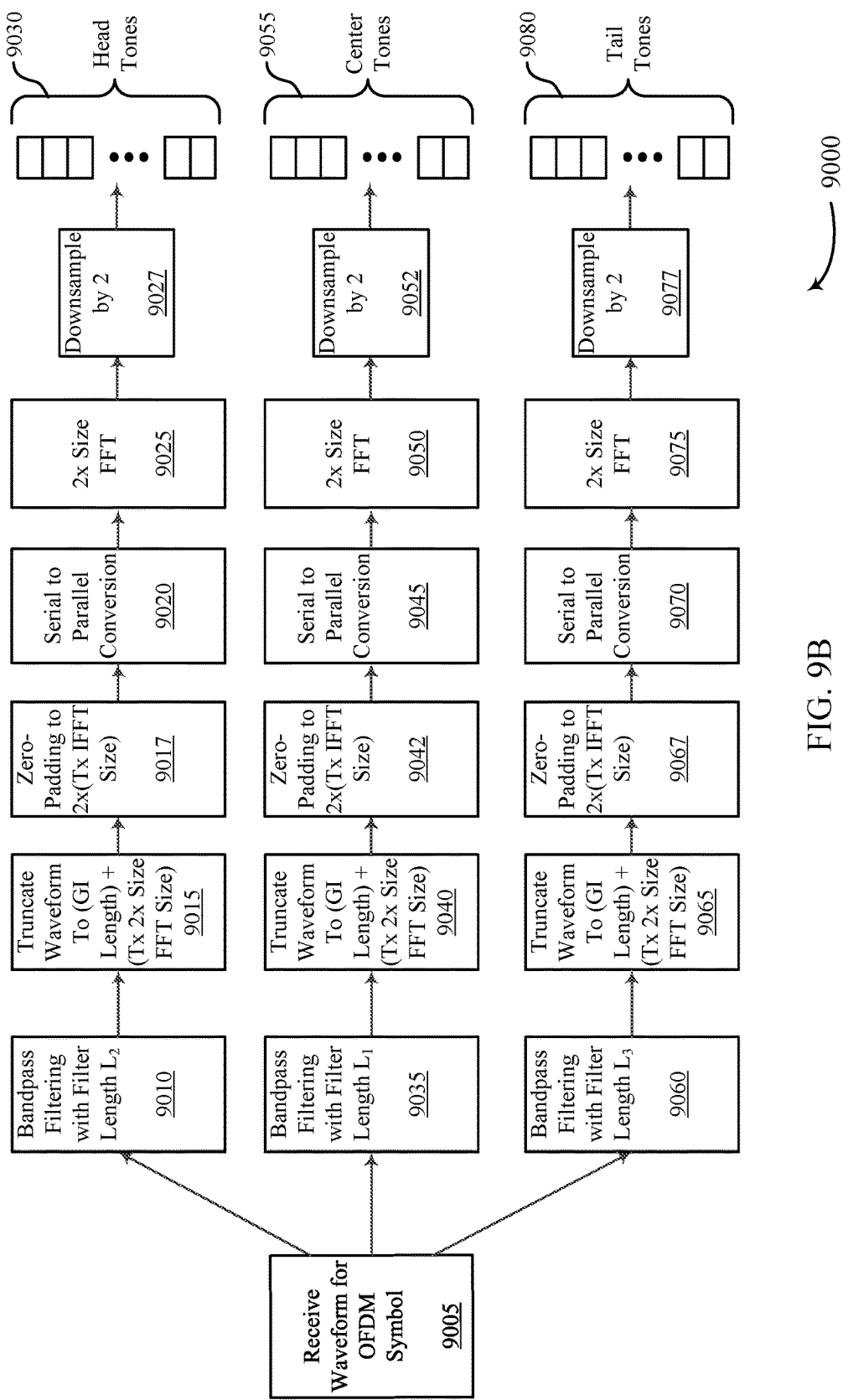
FIG. 9B illustrates an example of receive processing chains for heterogeneous transmission filtering for OFDM waveforms with guard intervals in accordance with aspects of the present disclosure.

FIG. 9B illustrates an example of receive processing chains 9000 for heterogeneous transmission filtering for OFDM waveforms with guard intervals. In some cases, processing chains 9000 may represent aspects of techniques performed by a UE or base station as described with reference to FIGS. 1-2.

As discussed above, again various examples may divide tones of an OFDM symbols into two or more subsets of tones, and in some examples each subset of tones may be filtered separately. In the example of FIG. 9B, head tones 9030 may include a subset of tones at the head, or beginning, of an OFDM symbol. A receiver may receive an OFDM symbol waveform at 9005. Processing for head tones 9030 include bandpass filtering the received waveform at a filtering function 9010 performed with a filter length $L_2$. The filtered samples may be truncated to a size corresponding to the transmit FFT size plus a guard interval length at truncation function 9015, with the truncated waveform provided to a zero-padding function 9017 to zero pad the waveform to the transmit IFFT size. The padded output is provided to serial to parallel conversion 9020 function, and provided to a 2-times size FFT 9025. The FFT output may be downsampled by two at downsampling function 9027, that may output the head tones 9030.

Similarly, center tones 9055 may include a subset of tones around the center of the OFDM symbol. The center tones 9055 processing may include bandpass filtering the received waveform at a filtering function 9035 performed with a filter length $L_1$. The filtered samples may be truncated to a size corresponding to the transmit FFT size plus a guard interval length at truncation function 9040, with the truncated waveform provided to a zero-padding function 9042 to zero pad the waveform to the transmit IFFT size. The padded output is provided to serial to parallel conversion 9045 function, and provided to a 2-times size FFT 9050. The FFT output may be downsampled by two at downsampling function 9052, that may output the center tones 9055.

Likewise, tail tones 9080 may include a subset of tones at the tail, or end, of the OFDM symbol. The tail tones 9080 processing may bandpass filtering the received waveform at a filtering function 9060 performed with a filter length $L_3$. The filtered samples may be truncated to a size corresponding to the transmit FFT size plus a guard interval length at truncation function 9065, with the truncated waveform provided to a zero-padding function 9067 to zero pad the waveform to the transmit IFFT size. The padded output is provided to serial to parallel conversion 9070 function, and provided to a 2-times size FFT 9075. The FFT output may be downsampled by two at downsampling function 9077, that may output the tail tones 9080.

As discussed above, in some examples the filter length $L_1$ may be selected to be shorter than the filter length $L_2$, which may provide reduced ISI effects at the center tones 9055, and reduced ICI effects and improved OOB suppression for head tones 9030 and tail tones 9080.

Figure 10:
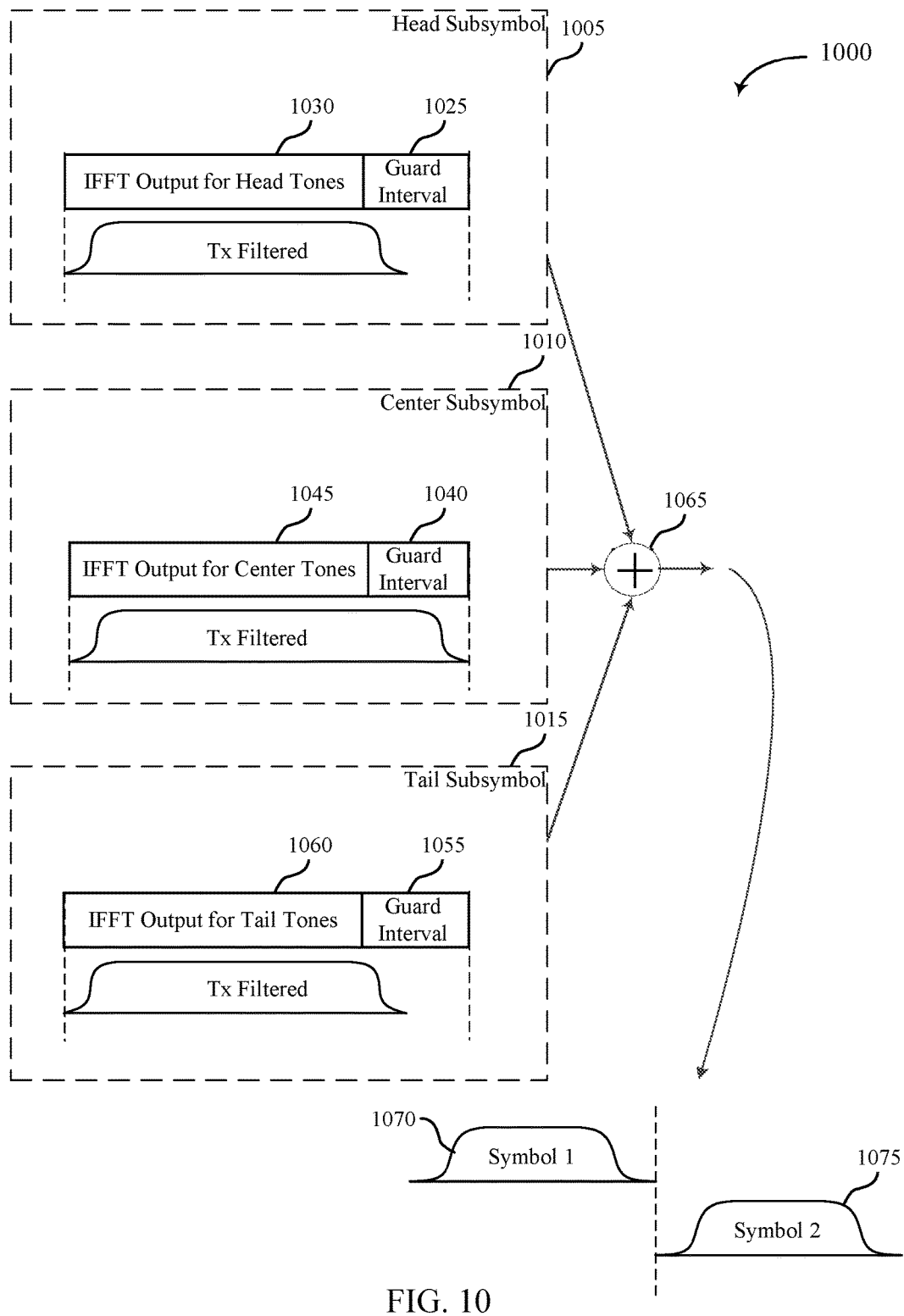
FIG. 10 illustrates an example of sub-symbol processing and symbol overlapping for heterogeneous transmission filtering for OFDM waveforms with guard intervals in accordance with aspects of the present disclosure.

FIG. 10 illustrates an example of sub-symbol processing and symbol overlapping 1000 for heterogeneous transmission filtering for OFDM waveforms with guard intervals. In some cases, sub-symbol processing and symbol overlapping 1000 may represent aspects of techniques performed by a UE or base station as described with reference to FIGS. 1-2.

In the example of FIG. 10, head sub-symbol 1005 may be filtered using a filter length $L_2$, as discussed above with respect to FIG. 9. In this example, filtering may begin at the beginning of IFFT output 1030 and end during guard interval 1025. Similarly, center sub-symbol 1010 may be filtered using a filter length $L_1$, as discussed above with respect to FIG. 9. In this example, filtering may begin at the beginning of IFFT output 1045 and end at the end of guard interval 1040. Finally, tail sub-symbol 1015 may be filtered using a filter length $L_3$, as discussed above with respect to FIG. 9. In this example, filtering may begin at the beginning of IFFT output 1060 and end during guard interval 1055.

Each of the subsymbol 1005-1015 waveforms may be combined at combiner 1065, which may align and add the sub-symbols 1005-1015 to provide a symbol waveform such as waveform 1070 for symbol 1. The waveform from combiner 1065 may be provided, and a subsequent waveform 1075 for a subsequent symbol may be concatenated with the waveform 1070 and transmitted to a receiver.

Figure 11:
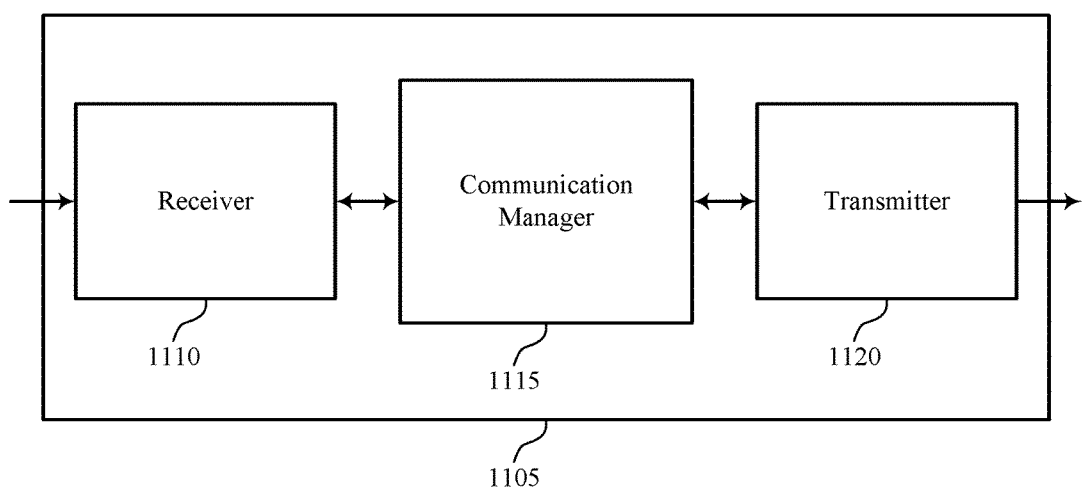
FIGS. 11 through 13 show block diagrams of a device that supports heterogeneous WOLA windowing and filtering for OFDM waveforms in accordance with aspects of the present disclosure.

FIG. 11 shows a block diagram 1100 of a device 1105 that supports heterogeneous weighted overlap-add windowing and filtering for OFDM and/or SC-FDMA waveforms in accordance with various aspects of the present disclosure. Device 1105 may be an example of aspects of a UE or base station as described with reference to FIGS. 1 and 2. Device 1105 may include receiver 1110, Communication manager 1115, and transmitter 1120. Device 1105 may also include a processor. Each of these components may be in communication with one another (e.g., via one or more buses).

Receiver 1110 may receive information such as packets, user data, or control information associated with various information channels (e.g., control channels, data channels, and information related to heterogeneous weighted overlap-add windowing and filtering for OFDM waveforms, etc.). Information may be passed on to other components of the device. The receiver 1110 may be an example of aspects of the transceiver 1440 described with reference to FIG. 14 or transceiver 1540 described with reference to FIG. 15.

Communication manager 1115 may be an example of aspects of the UE Communication manager 1415 described with reference to FIG. 14 or the base station Symbol communication manager 1515 described with reference to FIG. 15. Communication manager 1115 may identify a set of tones of a first symbol, a first subset of the set of tones, and a second subset of the set of tones, apply a first weighting length to the first subset of the set of tones and a second weighting length to the second subset of the set of tones in a WOLA procedure, the second weighting length being longer than the first weighting length, and obtain a first transmission waveform for the first symbol based on the applying.

Communication manager 1115 may also identify a set of tones of a first symbol, a first subset of the set of tones, and a second subset of the set of tones, apply a first filter length to the first subset of the set of tones and a second filter length to the second subset of the set of tones in a bandpass filtering procedure, the second filter length being longer than the first filter length, and obtain a first transmission waveform for the first symbol based on the applying.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1440 described with reference to FIG. 14 or the transceiver 1540 described with reference to FIG. 15. The transmitter 1120 may include a single antenna, or it may include a set of antennas.

In some example, transmitter 1120 may transmit the first transmission waveform, transmit the overlapped and added first transmission waveform and second transmission waveform, transmit the first transmission waveform, transmit the overlapped and added first transmission waveform and second transmission waveform, and transmit the concatenated first transmission waveform and second transmission waveform.

Figure 12:
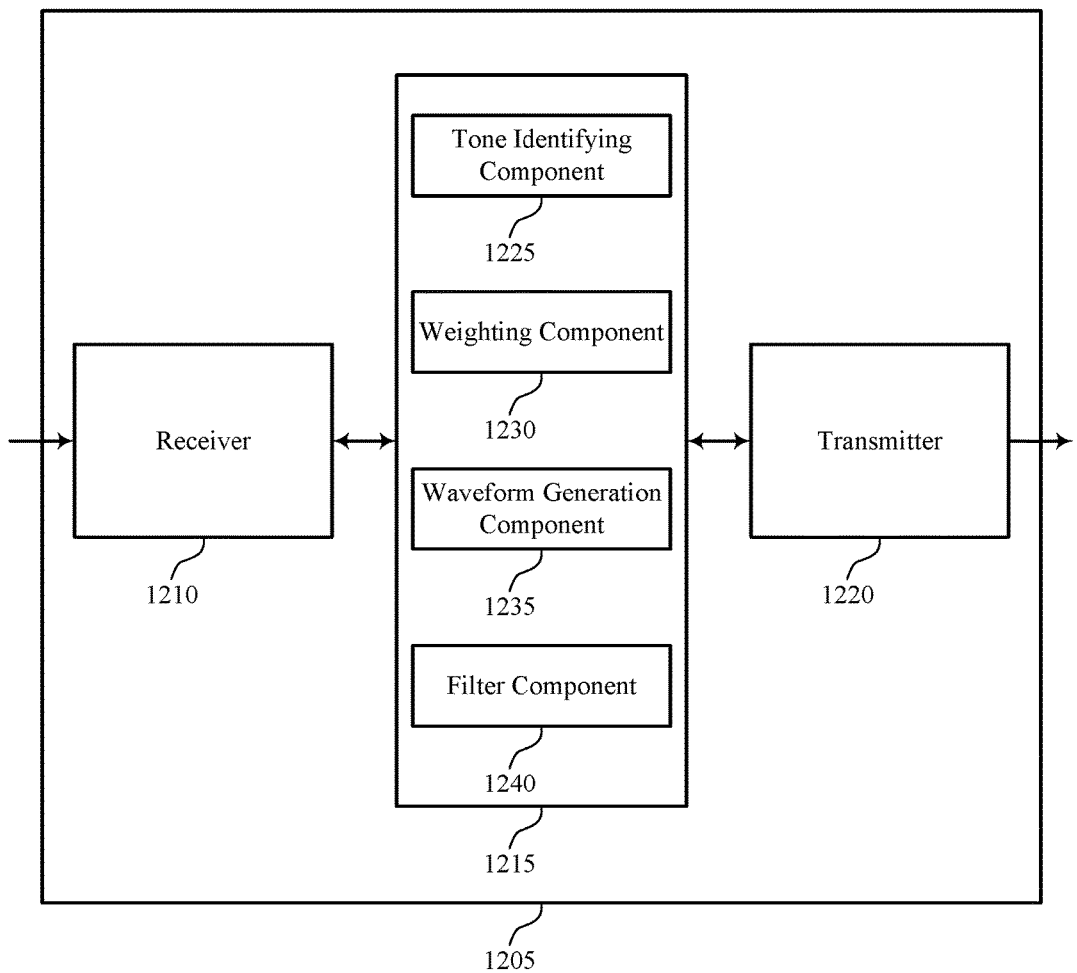

FIG. 12 shows a block diagram 1200 of a device 1205 that supports heterogeneous weighted overlap-add windowing and filtering for waveforms in accordance with various aspects of the present disclosure. Device 1205 may be an example of aspects of a device 1105 or a UE or base station as described with reference to FIGS. 1, 2 and 11. Device 1205 may include receiver 1210, communication manager 1215, and transmitter 1220. Device 1205 may also include a processor. Each of these components may be in communication with one another (e.g., via one or more buses).

Receiver 1210 may receive information such as packets, user data, or control information associated with various information channels (e.g., control channels, data channels, and information related to heterogeneous weighted overlap-add windowing and filtering for OFDM and/or SC-FDMA waveforms, etc.). Information may be passed on to other components of the device. The receiver 1210 may be an example of aspects of the transceiver 1440 described with reference to FIG. 14 or the transceiver 1540 described with reference to FIG. 15.

Communication manager 1215 may be an example of aspects of the UE communication manager 1415 described with reference to FIG. 14 or the base station symbol communication manager 1515 described with reference to FIG. 15. Communication manager 1215 may also include tone identifying component 1225, weighting component 1230, waveform generation component 1235, and filter component 1240.

Tone identifying component 1225 may identify a set of tones of a first symbol, a first subset of the set of tones, and a second subset of the set of tones, identify a third subset of the set of tones including a tail portion of the set of tones, and where the applying further includes applying a third weighting length to the third subset of the set of tones in the WOLA procedure to obtain the first transmission waveform. In examples that utilize transmission filtering, tone identifying component 1225 may identify a third subset of the set of tones including a tail portion of the set of tones, where the applying further includes applying a third filter length to the third subset of the set of tones in the bandpass filtering procedure to obtain the first transmission waveform. In some cases, the first subset of the set of tones includes a center portion of the set of tones and the second subset of the set of tones includes a head portion of the set of tones.

Weighting component 1230 may apply a first weighting length to the first subset of the set of tones and a second weighting length to the second subset of the set of tones in a WOLA procedure, the second weighting length being longer than the first weighting length. In some examples, weighting component 1230 may select the first weighting length for a first weighting procedure to be performed on the first subset of the set of tones and select the second weighting length for a second weighting procedure to be performed on the second subset of the set of tones, perform the first weighting procedure on the first subset of the set of tones to obtain a weighted first subset of samples corresponding to the first subset of the set of tones, and perform the second weighting procedure on the second subset of the set of tones to obtain a weighted second subset of samples corresponding to the second subset of the set of tones. In some cases, a third weighting procedure may be performed with a third weighting length. The second and third weighting lengths may be longer than the first weighting length.

Waveform generation component 1235 may obtain a first transmission waveform for the first symbol based on the overlapping and adding the weighted first subset of samples and the weighted second subset of samples to obtain the first transmission waveform, and overlap and add the first transmission waveform and a second transmission waveform. In some cases, an amount of overlapping of the first transmission waveform and the second transmission waveform is determined based on a longest length of the first weighting length or the second weighting length.

Filter component 1240 may apply a first filter length to the first subset of the set of tones and a second filter length to the second subset of the set of tones in a bandpass filtering procedure, the second filter length being longer than the first filter length, perform the first bandpass filtering procedure on the first subset of the set of tones to obtain a filtered first subset of samples corresponding to the first subset of the set of tones and perform the second bandpass filtering procedure on the second subset of the set of tones to obtain a filtered second subset of samples corresponding to the second subset of the set of tones. Filter component 1240 may also bandpass filter a CP added to each subset of tones. In some examples, a CP may not be added to the set of tones, and the filter component 1240 may bandpass filter a guard interval and a subset of time domain samples corresponding to a subset of tones.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1440 described with reference to FIG. 14 or the transceiver 1540 described with reference to FIG. 15. The transmitter 1220 may include a single antenna, or it may include a set of antennas.

Figure 13:
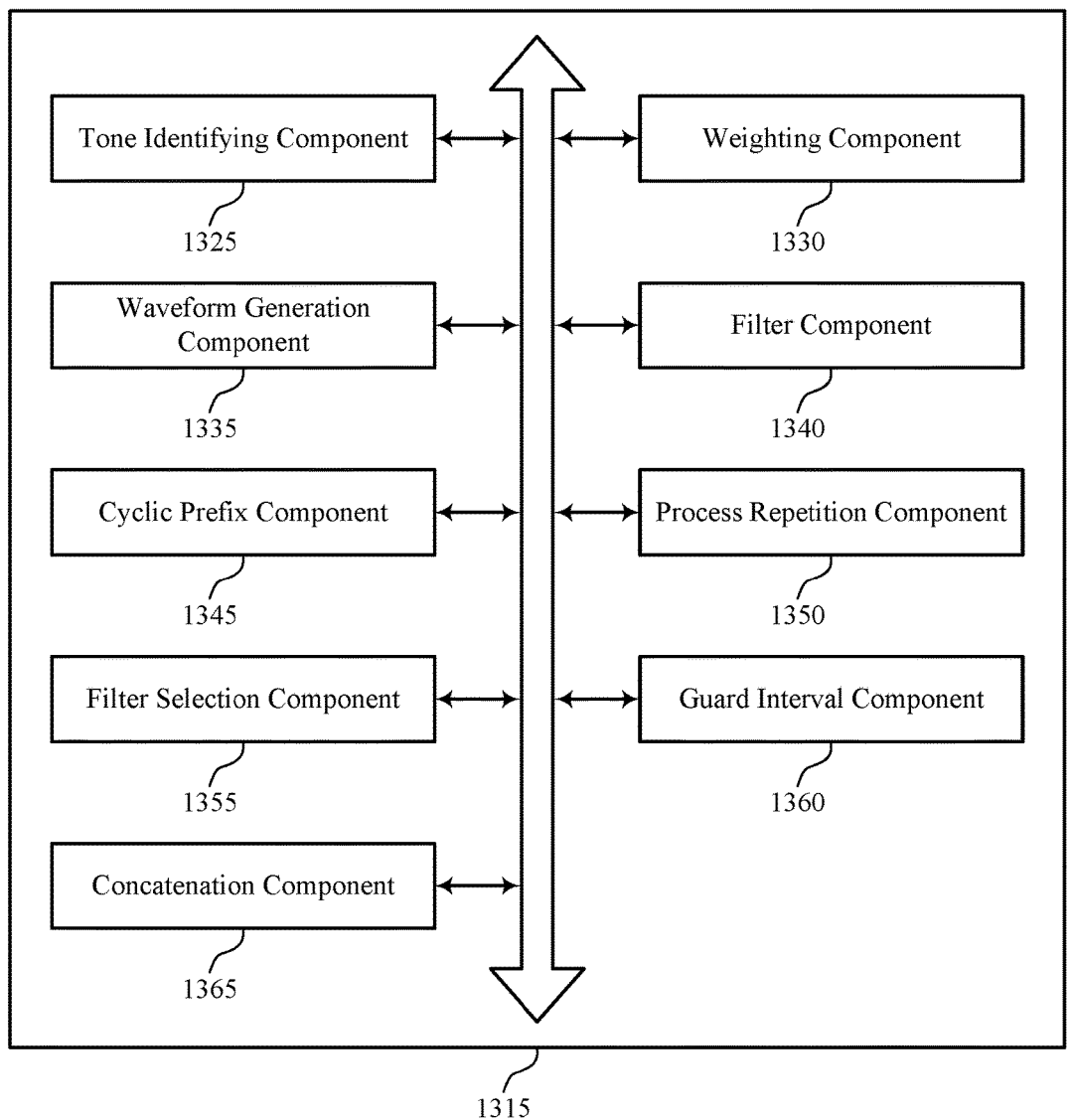

FIG. 13 shows a block diagram 1300 of a communication manager 1315 that supports heterogeneous weighted overlap-add windowing and filtering for OFDM and/or SC-FDMA waveforms in accordance with various aspects of the present disclosure. The communication manager 1315 may be an example of aspects of an Communication manager 1115, a communication manager 1215, a UE communication manager 1415, or a base station symbol communication manager 1515 described with reference to FIGS. 11, 12, 14, and 15. The communication manager 1315 may include tone identifying component 1325, weighting component 1330, waveform generation component 1335, and filter component 1340. Each of these modules may communicate, directly or indirectly, with one another (e.g., via one or more buses).

Tone identifying component 1325 may identify a set of tones of a first symbol, a first subset of the set of tones, and a second subset of the set of tones, identify a third subset of the set of tones including a tail portion of the set of tones. Weighting component 1330 may apply a first weighting length to the first subset of the set of tones and a second weighting length to the second subset of the set of tones in a WOLA procedure, the second weighting length being longer than the first weighting length. In some examples, weighting component 1330 may select the first weighting length for a first weighting procedure to be performed on the first subset of the set of tones and select the second weighting length for a second weighting procedure to be performed on the second subset of the set of tones.

Waveform generation component 1335 may obtain a first transmission waveform for the first symbol based on the weighted first subset of samples and the weighted second subset of samples to obtain the first transmission waveform, and may overlap and add the first transmission waveform and a second transmission waveform. In some cases, an amount of overlapping of the first transmission waveform and the second transmission waveform is determined based on a longest length of the first weighting length or the second weighting length.

Filter component 1340 may apply a first filter length to the first subset of the set of tones and a second filter length to the second subset of the set of tones in a bandpass filtering procedure, the second filter length being longer than the first filter length. The filter component 1340 also may perform the first bandpass filtering procedure on the first subset of the set of tones to obtain a filtered first subset of samples corresponding to the first subset of the set of tones and perform the second bandpass filtering procedure on the second subset of the set of tones to obtain a filtered second subset of samples corresponding to the second subset of the set of tones. In some examples, filter component 1340 may bandpass filter a CP or a guard interval added to time domain samples that correspond to a subset of tones based on a selected filter length associated with the subset of tones.

Cyclic prefix component 1345 may add a cyclic prefix to a set of time domain samples. In some cases, cyclic prefix component 1345 may add both a cyclic prefix and an extension length to each subset of time domain samples corresponding to the first or second subset of the set of tones, the extension length corresponding to a weighting length of the corresponding subset of tones. Process repetition component 1350 may repeat the identifying and the applying for a second set of tones of a second symbol to obtain a second transmission waveform for the second symbol.

Filter selection component 1355 may select the first filter length for a first bandpass filtering procedure to be performed on the first subset of the set of tones and select the second filter length for a second bandpass filtering procedure to be performed on the second subset of the set of tones. Guard interval component 1360 may add a guard interval to a subset of time domain samples, and concatenation component 1365 may concatenate the first transmission waveform and the second transmission waveform.

Figure 14:
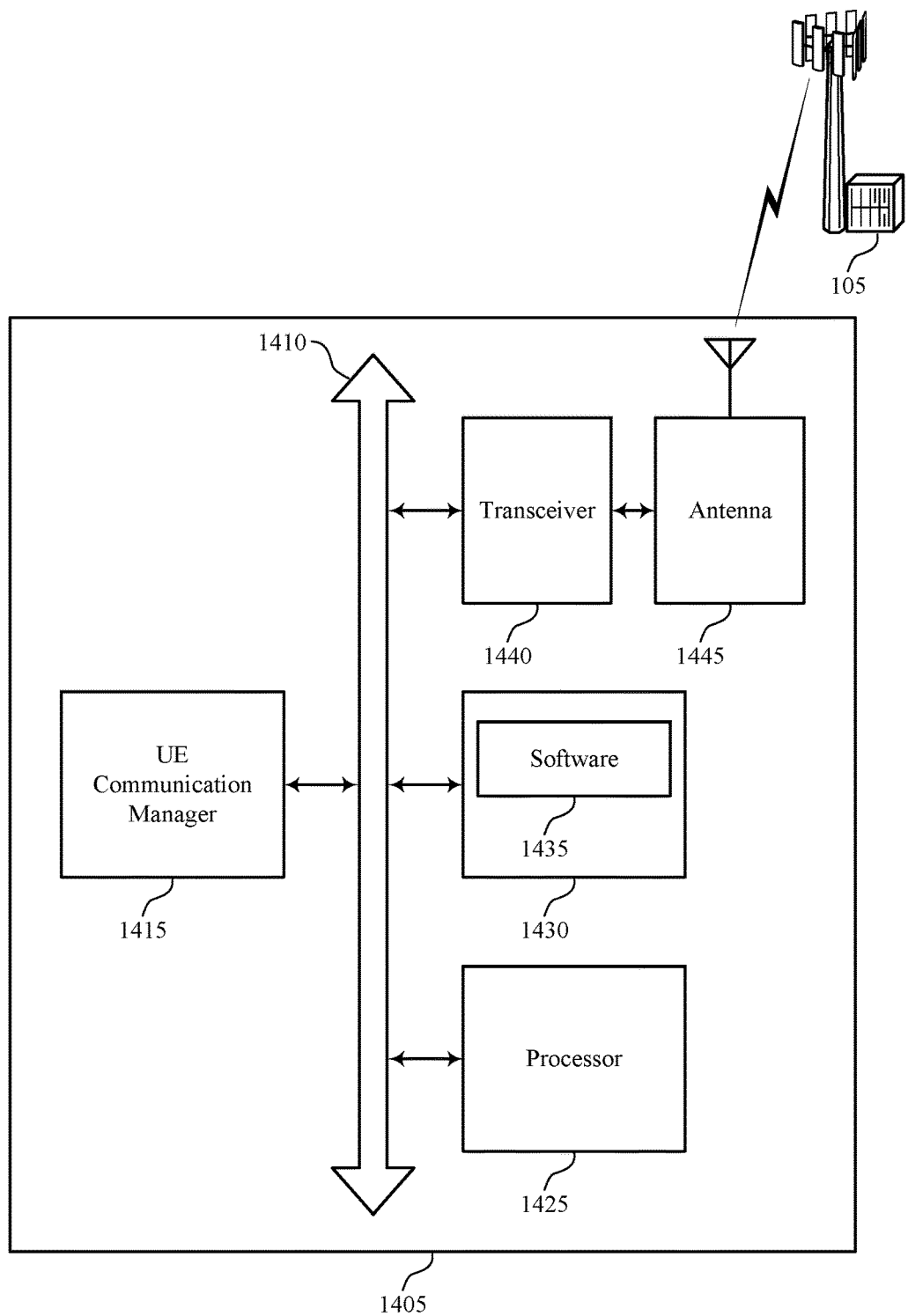
FIG. 14 illustrates a block diagram of a system including a UE that supports heterogeneous WOLA windowing and filtering for OFDM waveforms in accordance with aspects of the present disclosure.

FIG. 14 shows a diagram of a system 1400 including a device 1405 that supports heterogeneous weighted overlap-add windowing and filtering for OFDM and/or SC-FDMA waveforms in accordance with various aspects of the present disclosure. Device 1405 may be an example of a device 1105, device 1205, or a UE as described above, e.g., with reference to FIGS. 1, 2, 11, and 12.

Device 1405 may include components for bi-directional voice and data communications including components for transmitting and receiving communications, including UE communication manager 1415, processor 1425, memory 1430, software 1435, transceiver 1440, and antenna 1445. These components may be in electronic communication via one or more busses (e.g., bus 1410).

Processor 1425 may include an intelligent hardware device, (e.g., a central processing unit (CPU), a microcontroller, an application specific integrated circuit (ASIC), etc.) Memory 1430 may include random access memory (RAM) and read only memory (ROM). The memory 1430 may store computer-readable, computer-executable software 1435 including instructions that, when executed, cause the processor to perform various functions described herein. In some cases, the memory 1430 can contain, among other things, a Basic Input-Output system (BIOS) which may control basic hardware and/or software operation such as the interaction with peripheral components or devices.

Software 1435 may include code to implement aspects of the present disclosure, including code to support heterogeneous weighted overlap-add windowing and filtering for OFDM and/or SC-FDMA waveforms. Software 1435 can be stored in a non-transitory computer-readable medium such as system memory or other memory. In some cases, the software 1435 may not be directly executable by the processor but may cause a computer (e.g., when compiled and executed) to perform functions described herein.

Transceiver 1440 may communicate bi-directionally, via one or more antennas, wired, or wireless links as described above. For example, the transceiver 1440 may represent a wireless transceiver and may communicate bi-directionally with another wireless transceiver. The transceiver 1440 may also include a modem to modulate the packets and provide the modulated packets to the antennas for transmission, and to demodulate packets received from the antennas.

In some cases, the wireless device may include a single antenna 1445. However, in some cases the device may have more than one antenna 1445, which may be capable of concurrently transmitting or receiving multiple wireless transmissions.

Figure 15:
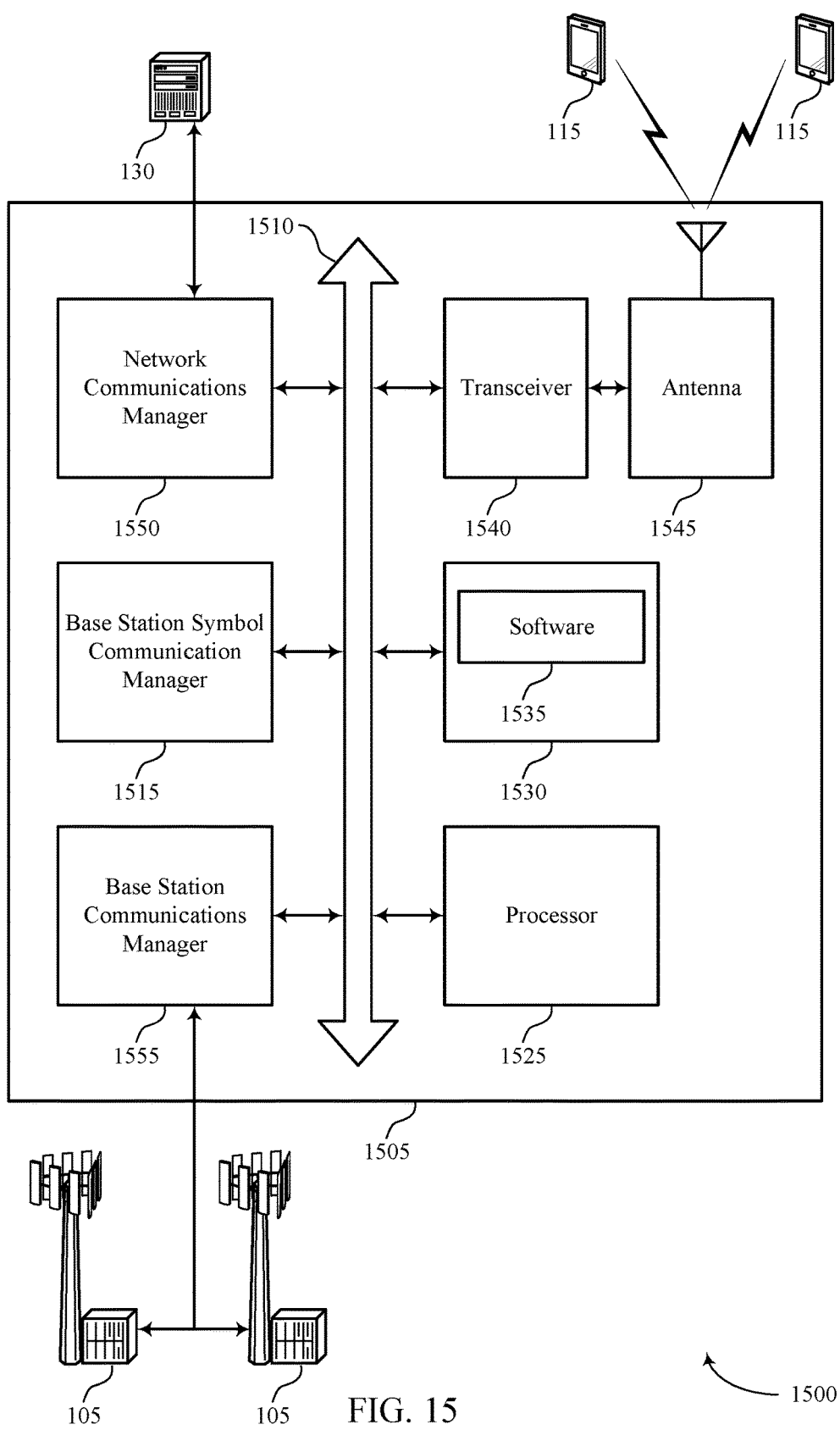
FIG. 15 illustrates a block diagram of a system including a base station that supports heterogeneous WOLA windowing and filtering for OFDM waveforms in accordance with aspects of the present disclosure.

FIG. 15 shows a diagram of a system 1500 including a device 1505 that supports heterogeneous weighted overlap-add windowing and filtering for OFDM and/or SC-FDMA waveforms in accordance with various aspects of the present disclosure. Device 1505 may be an example of a device 1105, a device 1205, or a base station as described above, e.g., with reference to FIGS. 1, 2, 11, 12 and 13.

Device 1505 may include components for bi-directional voice and data communications including components for transmitting and receiving communications, including base station symbol communication manager 1515, processor 1525, memory 1530, software 1535, transceiver 1540, antenna 1545, network communications manager 1550, and base station communications manager 1555. These components may be in electronic communication via one or more busses (e.g., bus 1510).

Processor 1525 may include an intelligent hardware device, (e.g., a central processing unit (CPU), a microcontroller, an application specific integrated circuit (ASIC), etc.) Memory 1530 may include random access memory (RAM) and read only memory (ROM). The memory 1530 may store computer-readable, computer-executable software 1535 including instructions that, when executed, cause the processor to perform various functions described herein. In some cases, the memory 1530 can contain, among other things, a Basic Input-Output system (BIOS) which may control basic hardware and/or software operation such as the interaction with peripheral components or devices.

Software 1535 may include code to implement aspects of the present disclosure, including code to support heterogeneous weighted overlap-add windowing and filtering for OFDM and/or SC-FDMA waveforms. Software 1535 can be stored in a non-transitory computer-readable medium such as system memory or other memory. In some cases, the software 1535 may not be directly executable by the processor but may cause a computer (e.g., when compiled and executed) to perform functions described herein.

Transceiver 1540 may communicate bi-directionally, via one or more antennas, wired, or wireless links as described above. For example, the transceiver 1540 may represent a wireless transceiver and may communicate bi-directionally with another wireless transceiver. The transceiver 1540 may also include a modem to modulate the packets and provide the modulated packets to the antennas for transmission, and to demodulate packets received from the antennas.

In some cases, the wireless device may include a single antenna 1545. However, in some cases the device may have more than one antenna 1545, which may be capable of concurrently transmitting or receiving multiple wireless transmissions.

Network communications manager 1550 may manage communications with the core network (e.g., via one or more wired backhaul links). For example, the network communications manager 1550 may manage the transfer of data communications for client devices, such as one or more UEs 115.

Base station communications manager 1555 may manage communications with other base station 105, and may include a controller or scheduler for controlling communications with UEs 115 in cooperation with other base stations 105. For example, the base station communications manager 1555 may coordinate scheduling for transmissions to UEs 115 for various interference mitigation techniques such as beamforming or joint transmission. In some examples, base station communications manager 1555 may provide an X2 interface within an LTE/LTE-A wireless communication network technology to provide communication between base stations 105.

Figure 16:
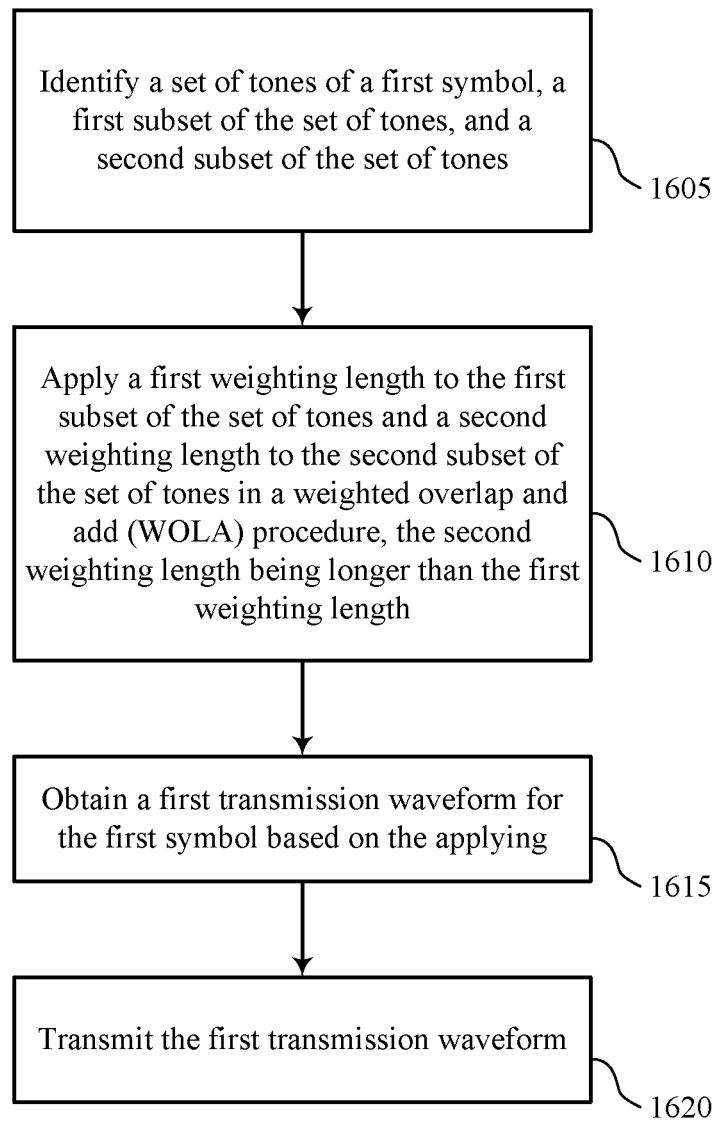
FIGS. 16 through 21 illustrate methods for heterogeneous WOLA windowing and filtering for OFDM waveforms in accordance with aspects of the present disclosure.

FIG. 16 shows a flowchart illustrating a method 1600 for heterogeneous weighted overlap-add windowing for OFDM and/or SC-FDMA waveforms in accordance with various aspects of the present disclosure. The operations of method 1600 may be implemented by a UE or base station or its components as described herein. For example, the operations of method 1600 may be performed by a communication manager as described with reference to FIGS. 11 through 13. In some examples, a UE or base station may execute a set of codes to control the functional elements of the device to perform the functions described below. Additionally or alternatively, the UE or base station may perform aspects the functions described below using special-purpose hardware.

At block 1605, the UE or base station may identify a set of tones of a first symbol, a first subset of the set of tones, and a second subset of the set of tones. The operations of block 1605 may be performed according to the methods described with reference to FIGS. 2 through 5. In certain examples, aspects of the operations of block 1605 may be performed by a tone identifying component as described with reference to FIGS. 11 through 13.

At block 1610, the UE or base station may apply a first weighting length to the first subset of the set of tones and a second weighting length to the second subset of the set of tones in a WOLA procedure, the second weighting length being longer than the first weighting length. The operations of block 1610 may be performed according to the methods described with reference to FIGS. 2 through 5. In certain examples, aspects of the operations of block 1610 may be performed by a weighting component as described with reference to FIGS. 11 through 13.

At block 1615, the UE or base station may obtain a first transmission waveform for the first symbol based on the applying. The operations of block 1615 may be performed according to the methods described with reference to FIGS. 2 through 5. In certain examples, aspects of the operations of block 1615 may be performed by a waveform generation component as described with reference to FIGS. 11 through 13.

At block 1620, the UE or base station may transmit the first transmission waveform. The operations of block 1620 may be performed according to the methods described with reference to FIGS. 2 through 5. In certain examples, aspects of the operations of block 1620 may be performed by a transmitter as described with reference to FIGS. 11 through 13.

Figure 17:
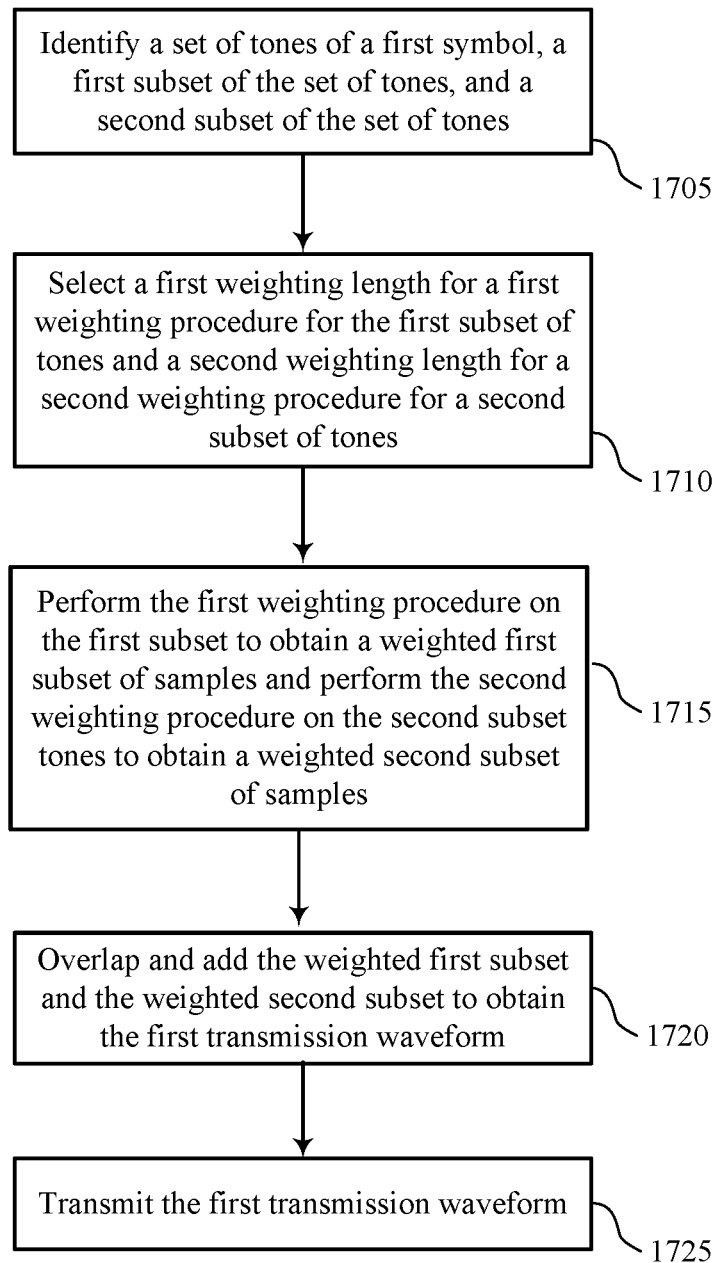

FIG. 17 shows a flowchart illustrating a method 1700 for heterogeneous weighted overlap-add windowing for OFDM and/or SC-FDMA waveforms in accordance with various aspects of the present disclosure. The operations of method 1700 may be implemented by a UE or base station or its components as described herein. For example, the operations of method 1700 may be performed by a communication manager as described with reference to FIGS. 11 through 13. In some examples, a UE or base station may execute a set of codes to control the functional elements of the device to perform the functions described below. Additionally or alternatively, the UE or base station may perform aspects the functions described below using special-purpose hardware.

At block 1705, the UE or base station may identify a set of tones of a first symbol, a first subset of the set of tones, and a second subset of the set of tones. The operations of block 1705 may be performed according to the methods described with reference to FIG. 2 through 5. In certain examples, aspects of the operations of block 1705 may be performed by a tone identifying component as described with reference to FIGS. 11 through 13.

At block 1710, the UE or base station may select the first weighting length for a first weighting procedure to be performed on the first subset of the set of tones and select the second weighting length for a second weighting procedure to be performed on the second subset of the set of tones. The operations of block 1710 may be performed according to the methods described with reference to FIGS. 2 through 5. In certain examples, aspects of the operations of block 1710 may be performed by a weighting component as described with reference to FIGS. 11 through 13.

At block 1715, the UE or base station may perform the first weighting procedure on the first subset of the set of tones to obtain a weighted first subset of samples corresponding to the first subset of the set of tones and perform the second weighting procedure on the second subset of the set of tones to obtain a weighted second subset of samples corresponding to the second subset of the set of tones. The operations of block 1715 may be performed according to the methods described with reference to FIGS. 2 through 5. In certain examples, aspects of the operations of block 1715 may be performed by a weighting component as described with reference to FIGS. 11 through 13.

At block 1720, the UE or base station may overlap and add the weighted first subset of samples and the weighted second subset of samples to obtain the first transmission waveform. The operations of block 1720 may be performed according to the methods described with reference to FIGS. 2 through 5. In certain examples, aspects of the operations of block 1720 may be performed by a waveform generation component as described with reference to FIGS. 11 through 13.

At block 1725, the UE or base station may transmit the first transmission waveform. The operations of block 1725 may be performed according to the methods described with reference to FIG. 2 through 5. In certain examples, aspects of the operations of block 1725 may be performed by a transmitter as described with reference to FIGS. 11 through 13.

Figure 18:
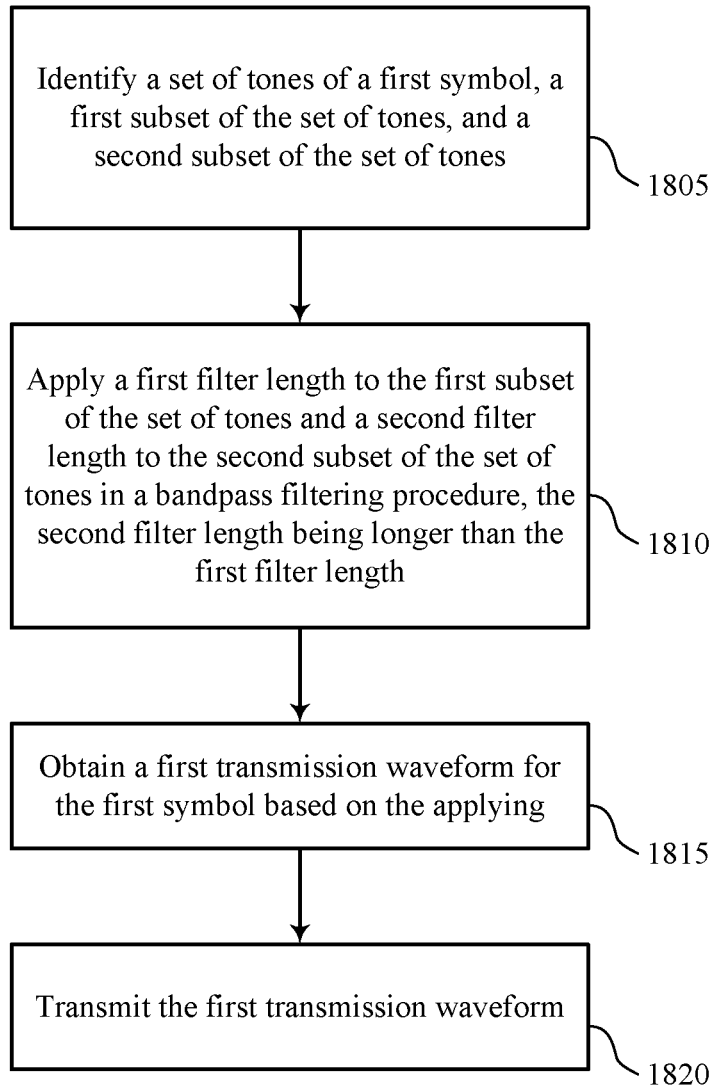

FIG. 18 shows a flowchart illustrating a method 1800 for heterogeneous filtering for waveforms in accordance with various aspects of the present disclosure. The operations of method 1800 may be implemented by a UE or base station or its components as described herein. For example, the operations of method 1800 may be performed by a communication manager as described with reference to FIGS. 11 through 13. In some examples, a UE or base station may execute a set of codes to control the functional elements of the device to perform the functions described below. Additionally or alternatively, the UE or base station may perform aspects the functions described below using special-purpose hardware.

At block 1805, the UE or base station may identify a set of tones of a first symbol, a first subset of the set of tones, and a second subset of the set of tones. The operations of block 1805 may be performed according to the methods described with reference to FIGS. 6 through 10. In certain examples, aspects of the operations of block 1805 may be performed by a tone identifying component as described with reference to FIGS. 11 through 13.

At block 1810, the UE or base station may apply a first filter length to the first subset of the set of tones and a second filter length to the second subset of the set of tones in a bandpass filtering procedure, the second filter length being longer than the first filter length. The operations of block 1810 may be performed according to the methods described with reference to FIGS. 6 through 10. In certain examples, aspects of the operations of block 1810 may be performed by a filter component as described with reference to FIGS. 11 through 13.

At block 1815, the UE or base station may obtain a first transmission waveform for the first symbol based on the applying. The operations of block 1815 may be performed according to the methods described with reference to FIGS. 6 through 10. In certain examples, aspects of the operations of block 1815 may be performed by a waveform generation component as described with reference to FIGS. 11 through 13.

At block 1820, the UE or base station may transmit the first transmission waveform. The operations of block 1820 may be performed according to the methods described with reference to FIGS. 6 through 10. In certain examples, aspects of the operations of block 1820 may be performed by a transmitter as described with reference to FIGS. 11 through 13.

Figure 19:
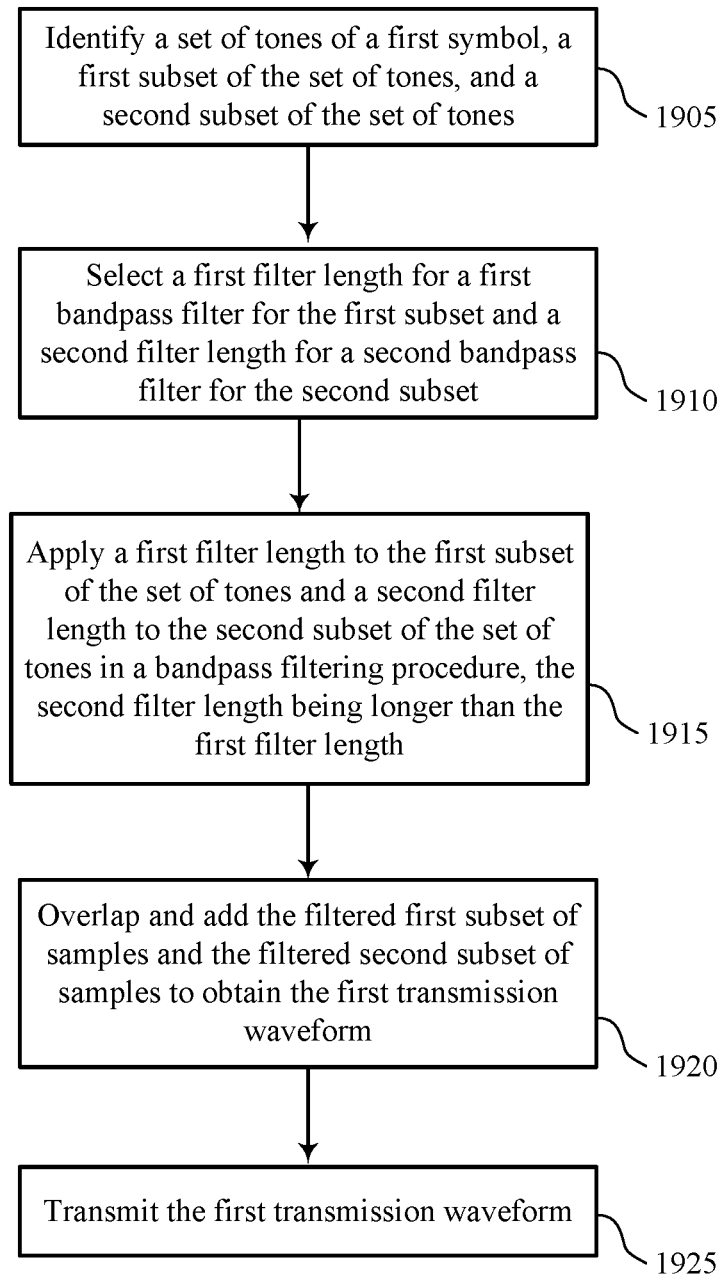

FIG. 19 shows a flowchart illustrating a method 1900 for heterogeneous filtering for OFDM and/or SC-FDMA waveforms in accordance with various aspects of the present disclosure. The operations of method 1900 may be implemented by a UE or base station or its components as described herein. For example, the operations of method 1900 may be performed by a communication manager as described with reference to FIGS. 11 through 13. In some examples, a UE or base station may execute a set of codes to control the functional elements of the device to perform the functions described below. Additionally or alternatively, the UE or base station may perform aspects the functions described below using special-purpose hardware.

At block 1905, the UE or base station may identify a set of tones of a first symbol, a first subset of the set of tones, and a second subset of the set of tones. The operations of block 1905 may be performed according to the methods described with reference to FIG. 6 through 10. In certain examples, aspects of the operations of block 1905 may be performed by a tone identifying component as described with reference to FIGS. 11 through 13.

At block 1910, the UE or base station may select a first filter length for a first bandpass filtering procedure to be performed on the first subset and select a second filter length for a second bandpass filtering procedure to be performed on the second subset of the set of tones. The operations of block 1910 may be performed according to the methods described with reference to FIGS. 6 through 10. In certain examples, aspects of the operations of block 1910 may be performed by a filter selection component as described with reference to FIGS. 11 through 13.

At block 1915, the UE or base station may apply a first filter length to the first subset of the set of tones and a second filter length to the second subset of the set of tones in a bandpass filtering procedure, the second filter length being longer than the first filter length. The operations of block 1915 may be performed according to the methods described with reference to FIGS. 6 through 10. In certain examples, aspects of the operations of block 1915 may be performed by a filter component as described with reference to FIGS. 11 through 13.

At block 1920, the UE or base station may overlap and add the filtered first subset of samples and the filtered second subset of samples to obtain the first transmission waveform. The operations of block 1920 may be performed according to the methods described with reference to FIGS. 6 through 10. In certain examples, aspects of the operations of block 1920 may be performed by a waveform generation component as described with reference to FIGS. 11 through 13.

At block 1925, the UE or base station may transmit the first transmission waveform. The operations of block 1925 may be performed according to the methods described with reference to FIGS. 6 through 10. In certain examples, aspects of the operations of block 1925 may be performed by a transmitter as described with reference to FIGS. 11 through 13.

Figure 20:
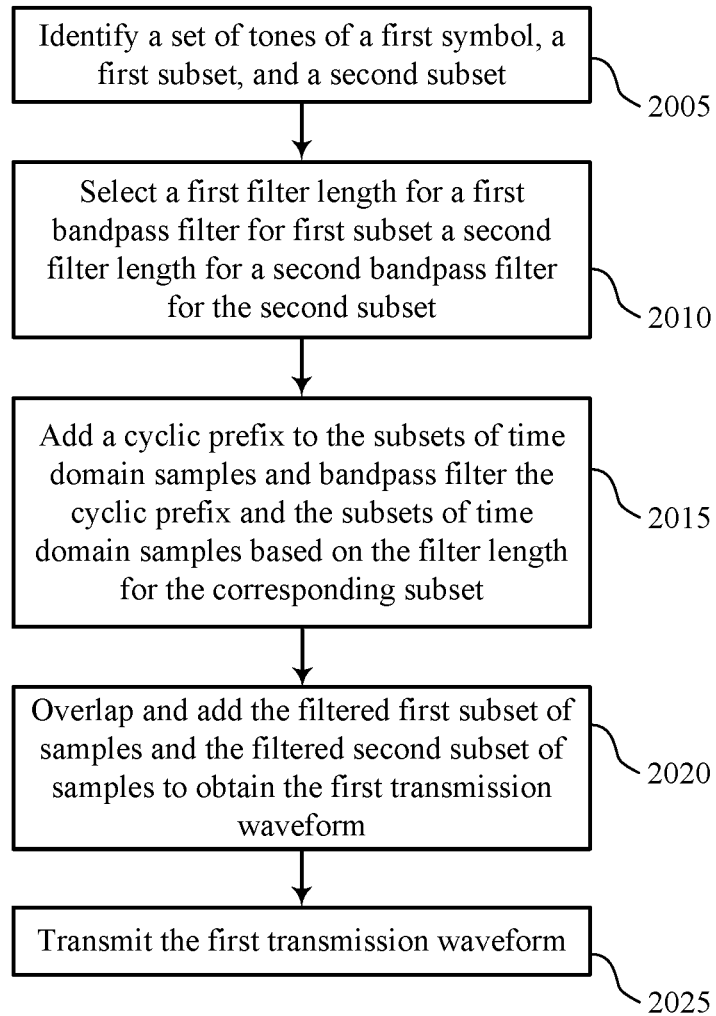

FIG. 20 shows a flowchart illustrating a method 2000 for heterogeneous filtering for OFDM waveforms in accordance with various aspects of the present disclosure. The operations of method 2000 may be implemented by a UE or base station or its components as described herein. For example, the operations of method 2000 may be performed by a communication manager as described with reference to FIGS. 11 through 13. In some examples, a UE or base station may execute a set of codes to control the functional elements of the device to perform the functions described below. Additionally or alternatively, the UE or base station may perform aspects the functions described below using special-purpose hardware.

At block 2005, the UE or base station may identify a set of tones of a first symbol, a first subset of the set of tones, and a second subset of the set of tones. The operations of block 2005 may be performed according to the methods described with reference to FIGS. 6 through 10. In certain examples, aspects of the operations of block 2005 may be performed by a tone identifying component as described with reference to FIGS. 11 through 13.

At block 2010, the UE or base station may select a first filter length for a first bandpass filtering procedure to be performed on the first subset of the set of tones and select a second filter length for a second bandpass filtering procedure to be performed on the second subset of the set of tones. The operations of block 2010 may be performed according to the methods described with reference to FIGS. 6 through 10. In certain examples, aspects of the operations of block 2010 may be performed by a filter selection component as described with reference to FIGS. 11 through 13.

At block 2015, the UE or base station may add a cyclic prefix to the subsets of time domain samples and bandpass filter the cyclic prefix and the subsets of time domain samples based on the filter length for the corresponding subset. The operations of block 2015 may be performed according to the methods described with reference to FIGS. 6 through 10. In certain examples, aspects of the operations of block 2015 may be performed by a filter component as described with reference to FIGS. 11 through 13.

At block 2020, the UE or base station may overlap and add the filtered first subset of samples and the filtered second subset of samples to obtain the first transmission waveform. The operations of block 2020 may be performed according to the methods described with reference to FIGS. 6 through 10. In certain examples, aspects of the operations of block 2025 may be performed by a waveform generation component as described with reference to FIGS. 11 through 13.

At block 2025, the UE or base station may transmit the first transmission waveform. The operations of block 2025 may be performed according to the methods described with reference to FIGS. 6 through 10. In certain examples, aspects of the operations of block 2025 may be performed by a transmitter as described with reference to FIGS. 11 through 13.

Figure 21:
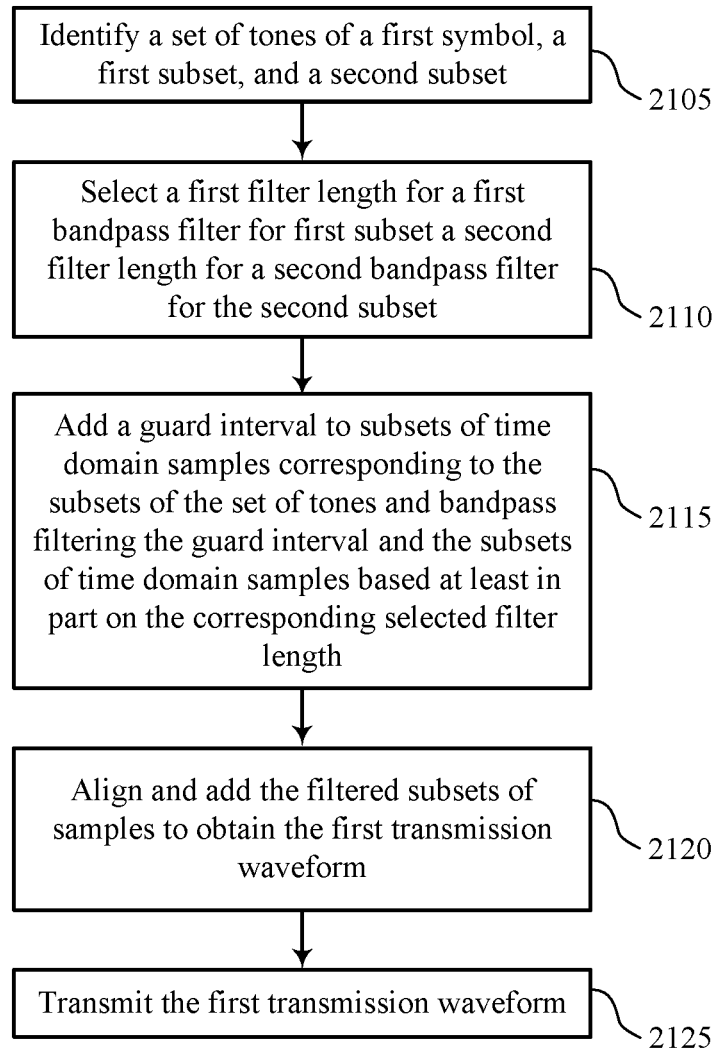

FIG. 21 shows a flowchart illustrating a method 2100 for heterogeneous filtering for OFDM waveforms in accordance with various aspects of the present disclosure. The operations of method 2100 may be implemented by a UE or base station or its components as described herein. For example, the operations of method 2100 may be performed by a communication manager as described with reference to FIGS. 11 through 13. In some examples, a UE or base station may execute a set of codes to control the functional elements of the device to perform the functions described below. Additionally or alternatively, the UE or base station may perform aspects the functions described below using special-purpose hardware.

At block 2105, the UE or base station may identify a set of tones of a first symbol, a first subset of the set of tones, and a second subset of the set of tones. The operations of block 2105 may be performed according to the methods described with reference to FIGS. 6 through 10. In certain examples, aspects of the operations of block 2105 may be performed by a tone identifying component as described with reference to FIGS. 11 through 13.

At block 2110, the UE or base station may select a first filter length for a first bandpass filtering procedure to be performed on the first subset of the set of tones and select a second filter length for a second bandpass filtering procedure to be performed on the second subset of the set of tones. The operations of block 2110 may be performed according to the methods described with reference to FIGS. 6 through 10. In certain examples, aspects of the operations of block 2110 may be performed by a filter selection component as described with reference to FIGS. 11 through 13.

At block 2115, the UE or base station may add a guard interval to subsets of time domain samples corresponding to the subsets of the set of tones and bandpass filter the guard interval and the subsets of time domain samples based at least in part on the corresponding selected filter length. The operations of block 2115 may be performed according to the methods described with reference to FIG. 6 through 10. In certain examples, aspects of the operations of block 2115 may be performed by a filter component as described with reference to FIGS. 11 through 13.

At block 2120, the UE or base station may align and add the filtered first subset of samples and the filtered second subset of samples to obtain the first transmission waveform. The operations of block 2120 may be performed according to the methods described with reference to FIGS. 6 through 10. In certain examples, aspects of the operations of block 2125 may be performed by a waveform generation component as described with reference to FIGS. 11 through 13.

At block 2125, the UE or base station may transmit the first transmission waveform. The operations of block 2125 may be performed according to the methods described with reference to FIGS. 6 through 10. In certain examples, aspects of the operations of block 2125 may be performed by a transmitter as described with reference to FIGS. 11 through 13.

Figure 22A:
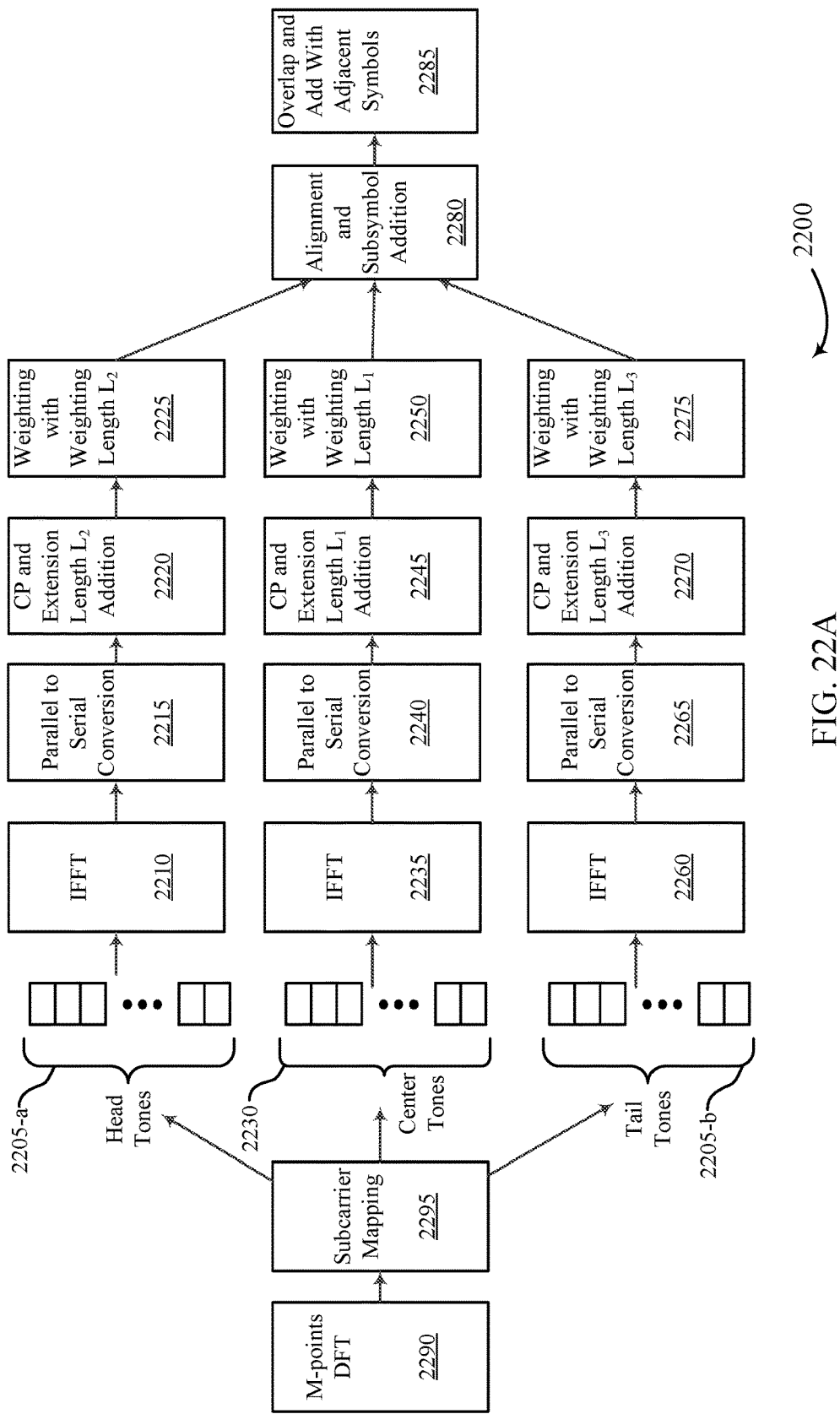
FIG. 22A illustrates an example of transmit processing chains for heterogeneous WOLA windowing for SC-FDMA waveforms in accordance with aspects of the present disclosure.

FIG. 22A illustrates an example of transmit processing chains 2200 for heterogeneous WOLA windowing for SC-FDMA waveforms. In some cases, processing chains 2200 may represent aspects of techniques performed by a UE or base station as described with reference to FIGS. 1-2.

As discussed above, various examples may divide discrete Fourier transform (DFT) spread tones of a SC-FDMA symbols (e.g., M-point DFT 2290 resulting tones), after subcarrier mapping 2295, into two or more subsets of tones, and each subset of tones may be processed separately for WOLA weighting. In the example of FIG. 22A, edge tones 2205 may include a subset of tones at the head, or beginning, of a SC-FDMA symbol (e.g., edge tones 2205-a). The edge tones 2205-a may be provided to IFFT 2210 that may generate a number of samples corresponding to edge tones 2205-a, which may be provided to a parallel to serial conversion 2215 function to generate a series of time samples corresponding to edge tones 2205-a. A CP and extension with length $L_2$ may be added to the time samples at 2220, and a weighting function 2225 performed with a weighting length $L_2$ that corresponds to extension length $L_2$.

Similarly, center tones 2230 may include a subset of tones around the center of the SC-FDMA symbol. The center tones 2230 may be provided to IFFT 2235 that may generate a number of samples corresponding to center tones 2230, which may be provided to a parallel to serial conversion 2240 function to generate a series of time samples corresponding to center tones 2230. A CP and extension with length $L_1$ may be added to the time samples at 2245, and a weighting function 2250 performed with a weighting length $L_1$ that corresponds to extension length $L_1$.

Likewise, edge tones 2205 may include a subset of tones at the tail, or end, of the SC-FDMA symbol (e.g., edge tones 2205-b). The edge tones 2205-b may be provided to IFFT 2260 that may generate a number of samples corresponding to edge tones 2205-b, which may be provided to a parallel to serial conversion 2265 function to generate a series of time samples corresponding to edge tones 2205-b. A CP and extension with length $L_3$ may be added to the time samples at 2270, and a weighting function 2275 performed with a weighting length $L_3$ that corresponds to extension length $L_3$.

Each of the weighted sub-symbols may be provided to alignment and sub-symbol addition function 2280 that may assemble the weighted sub-symbols to provide a transmission waveform for the SC-FDMA symbol. The transmission waveform may be provided to overlap and add function 2285 to provide an overlapped and added waveform with adjacent symbols, that may then be transmitted by a transmitter.

As discussed above, in some examples the weighting length $L_1$ may be selected to be shorter than the weighting length $L_2$, which may provide reduced ISI effects at the center tones 2230, and reduced ICI effects and improved OOB suppression for head tones 405 and edge tones 2205-b. In some examples, the lengths $L_2$ and $L_3$ may be the same length, in which case the processing for both the edge tones 2205-a and the edge tones 2205-b may be performed in the same processing chain.

Figure 22B:
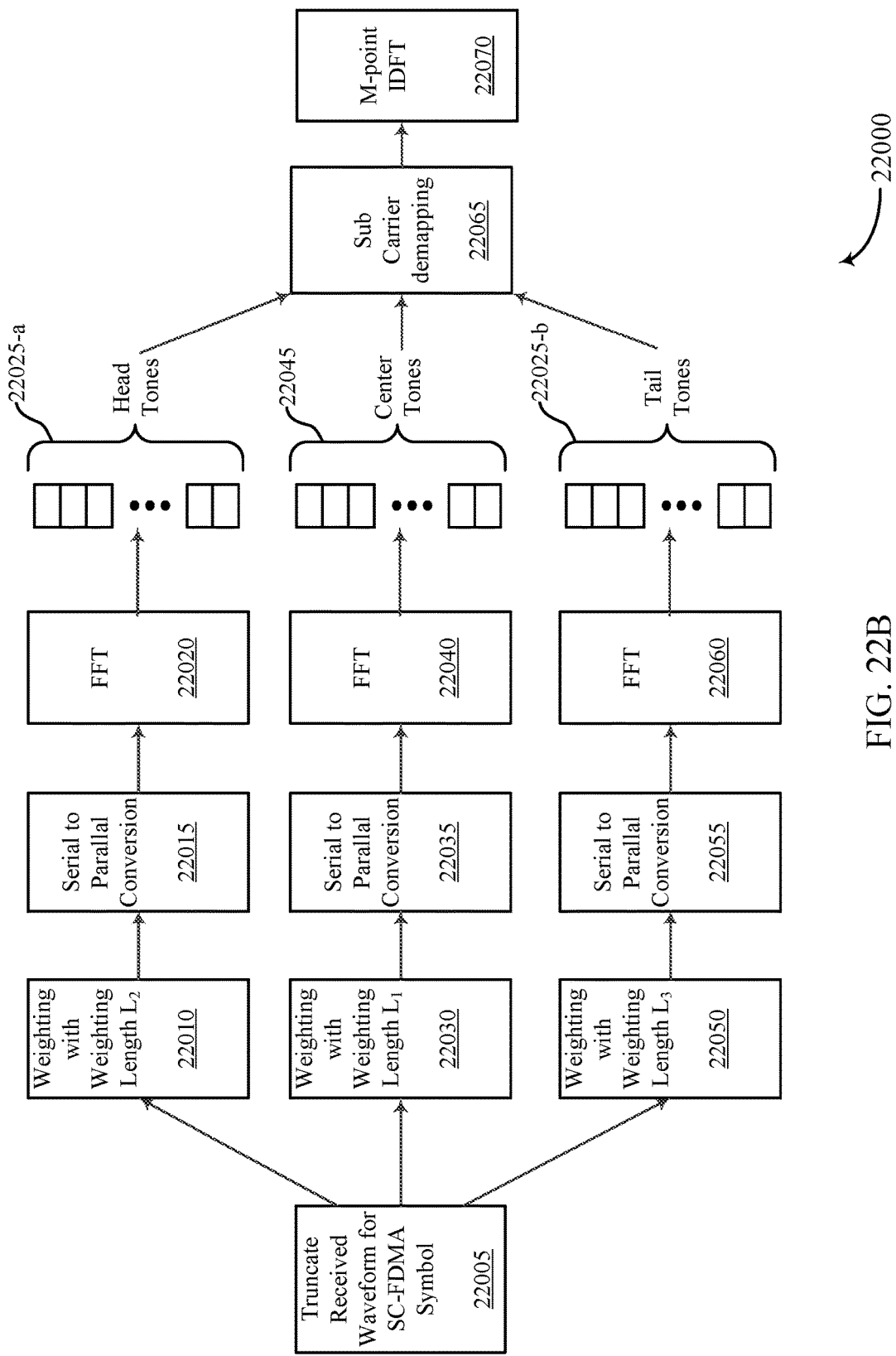
FIG. 22B illustrates an example of receive processing chains for heterogeneous WOLA windowing for SC-FDMA waveforms in accordance with aspects of the present disclosure.

FIG. 22B illustrates an example of receive processing chains 22000 for heterogeneous WOLA windowing for SC-FDMA waveforms. In some cases, processing chains 22000 may represent aspects of techniques performed by a UE or base station as described with reference to FIGS. 1-2.

As discussed above, various examples may divide DFT spread tones of a SC-FDMA symbol into two or more subsets of tones, and each subset of tones may be processed separately for WOLA weighting. In the example of FIG. 22B, a receiver may receive a SC-FDMA symbol waveform, and may truncate the received waveform for the SC-FDMA symbol at 22005. Processing for head tones (e.g., edge tones 22025-a) may include weighting the received waveform at a weighting function 22010 performed with a weighting length $L_2$ that corresponds to extension length $L_2$. The weighted samples may be provided to a serial to parallel conversion 22015 function, and provided to FFT 22020, that may output the edge tones 22025-a (e.g., head tones).

Similarly, center tones 22045 may include a subset of tones around the center of the SC-FDMA symbol. The center tones 22045 processing may include weighting the received waveform at a weighting function 22030 performed with a weighting length $L_1$ that corresponds to extension length $L_1$. The weighted samples may be provided to a serial to parallel conversion 22035 function, and provided to FFT 22040, that may output the center tones 22045.

Likewise, edge tones 22025-b may include a subset of tones at the tail, or end, of the SC-FDMA symbol. The edge tones 22025-b processing may include weighting the received waveform at a weighting function 22050 performed with a weighting length $L_3$ that corresponds to extension length $L_3$. The weighted samples may be provided to a serial to parallel conversion 22055 function, and provided to FFT 22060, that may output the edge tones 22025-b (e.g., tail tones).

As discussed above, in some examples the weighting length $L_1$ may be selected to be shorter than the weighting length $L_2$, which may provide reduced ISI effects at the center tones 22045, and reduced ICI effects and improved OOB suppression for edge tones 22025.

The edge tones 22025 and center tones 22045 may then be passed to a subcarrier de-mapper (e.g., subcarrier demapping 22065) to select the assigned M tones. These tones may then be de-spread via M-point IDFT 22070.

Figure 23A:
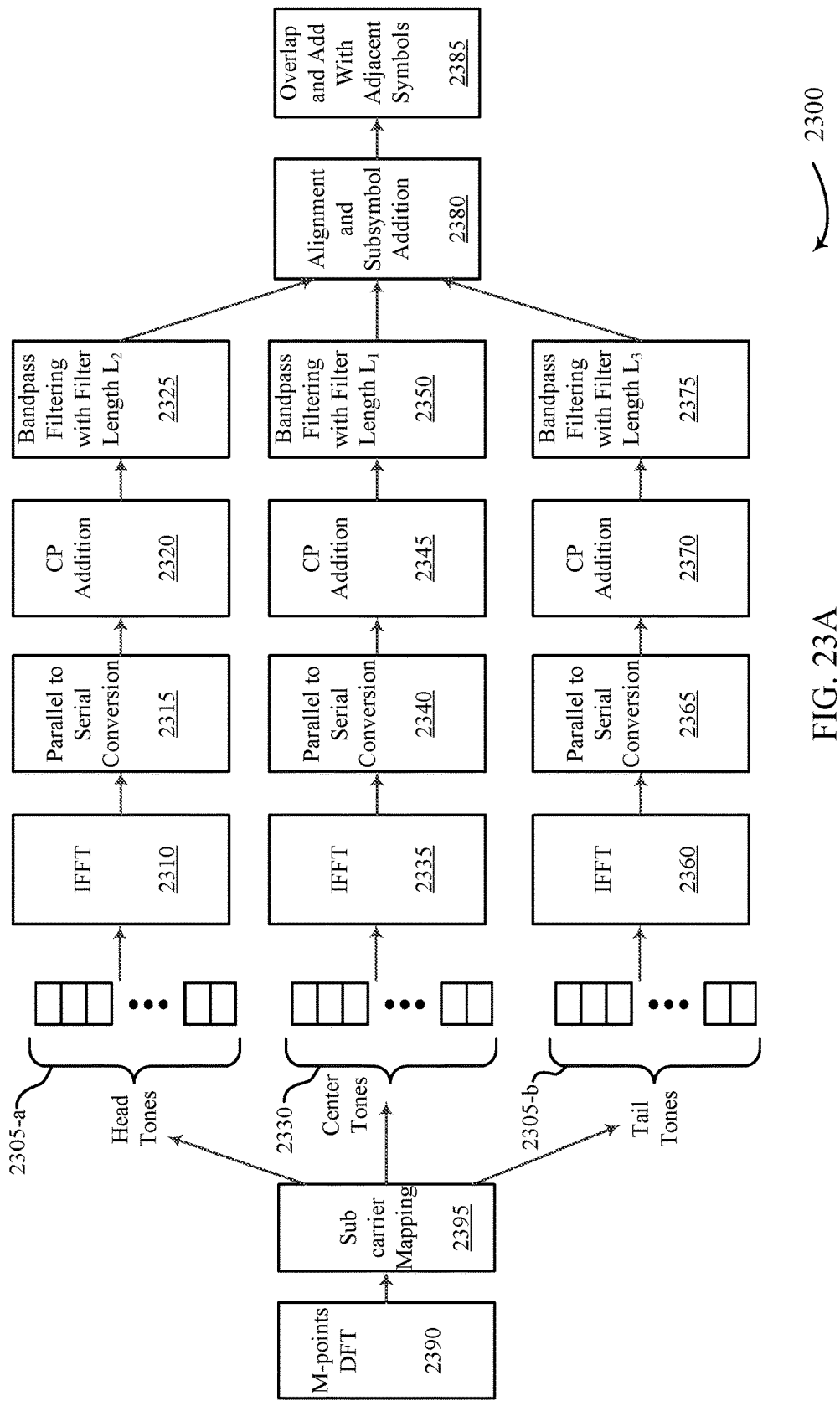
FIG. 23A illustrates an example of transmit processing chains for heterogeneous transmission filtering for SC-FDMA waveforms in accordance with aspects of the present disclosure.

FIG. 23A illustrates an example of transmit processing chains 2300 for heterogeneous transmission filtering for SC-FDMA waveforms. In some cases, processing chains 2300 may represent aspects of techniques performed by a UE or base station as described with reference to FIGS. 1-2.

As discussed above, various examples may divide DFT spread tones of a SC-FDMA symbols (e.g., M-point DFT 2390 resulting tones), after subcarrier mapping 2395, into two or more subsets of tones, and in some examples each subset of tones may be filtered separately. In the example of FIG. 23A, edge tones 2305 may include a subset of tones at the head, or beginning, of a SC-FDMA symbol (e.g., edge tones 2305-a). The edge tones 2305-a (e.g., head tones) may be provided to IFFT 2310 that may generate a number of samples corresponding to edge tones 2305-a, which may be provided to a parallel to serial conversion 2315 function to generate a series of time samples corresponding to edge tones 2305-a. A CP may be added to the time samples at 2320, and the CP and time samples may be filtered with a filter length $L_2$ at bandpass filter 2325.

Similarly, center tones 2330 may include a subset of tones around the center of the SC-FDMA symbol. The center tones 2330 may be provided to IFFT 2335 that may generate a number of samples corresponding to center tones 2330, which may be provided to a parallel to serial conversion 2340 function to generate a series of time samples corresponding to center tones 2330. A CP may be added to the time samples at 2345, and the CP and time samples may be filtered with a filter length $L_1$ at bandpass filter 2350.

Likewise, edge tones 2305 may include a subset of tones at the tail, or end, of the SC-FDMA symbol (e.g., edge tones 2305-b). The edge tones 2305-b (e.g., tail tones) may be provided to IFFT 2360 that may generate a number of samples corresponding to edge tones 2305-b, which may be provided to a parallel to serial conversion 2365 function to generate a series of time samples corresponding to edge tones 2305-b. A CP may be added to the time samples at 2370, and the CP and time samples may be filtered with a filter length $L_3$ at bandpass filter 2375.

Each of the filtered sub-symbols may be provided to alignment and sub-symbol addition function 2380 that may assemble the filtered sub-symbols to provide a transmission waveform for the SC-FDMA symbol. The transmission waveform may be provided to overlap and add function 2385 to provide an overlapped and added waveform with adjacent symbols, that may then be transmitted by a transmitter.

As discussed above, in some examples the filter length $L_1$ may be selected to be shorter than the filter length $L_2$, which may provide reduced ISI effects at the center tones 2330, and reduced ICI effects and improved OOB suppression for edge tones 2305 (e.g., head tones and tail tones). In some examples, the lengths $L_1$ and $L_2$ may be the same length, in which case the processing for both the edge tones 2305-a (e.g., head tones) and the edge tones 2305-b (e.g., tail tones) may be performed in the same processing chain.

Figure 23B:
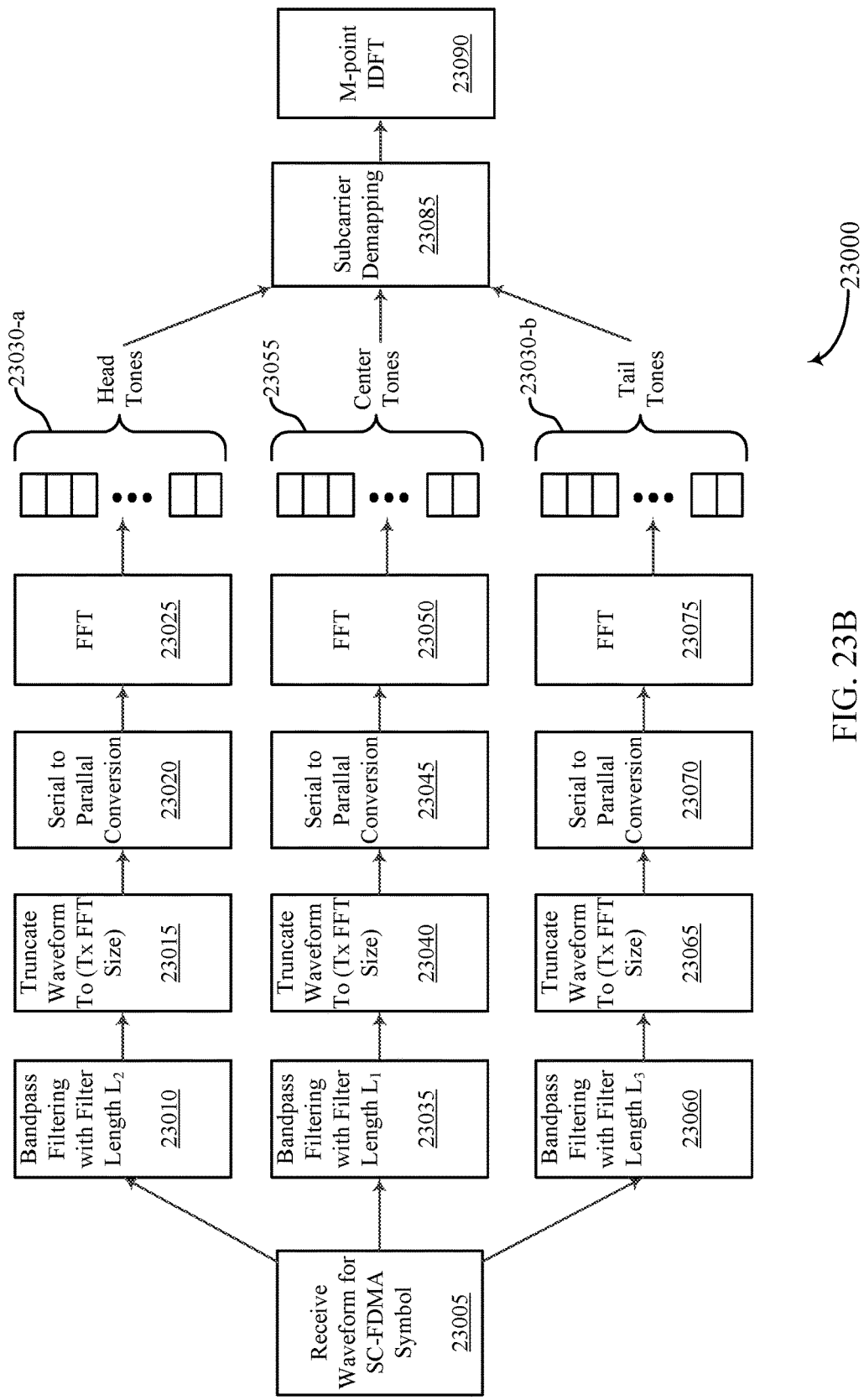
FIG. 23B illustrates an example of receive processing chains for heterogeneous transmission filtering for SC-FDMA waveforms in accordance with aspects of the present disclosure.

FIG. 23B illustrates an example of receive processing chains 23000 for heterogeneous transmission filtering for SC-FDMA waveforms. In some cases, processing chains 2300 may represent aspects of techniques performed by a UE or base station as described with reference to FIGS. 1-2.

As discussed above, various examples may divide DFT spread tones of a SC-FDMA symbols into two or more subsets of tones, and in some examples each subset of tones may be filtered separately. In the example of FIG. 23B, edge tones 23030 may include a subset of tones at the head, or beginning, of a SC-FDMA symbol (e.g., edge tones 23030-a). In the example of FIG. 23B, a receiver may receive a SC-FDMA symbol waveform at 23005. Processing for edge tones 23030-a (e.g., head tones) may include bandpass filtering the received waveform at a filtering function 23010 performed with a filter length $L_2$. The filtered samples may be truncated to a size corresponding to the transmit FFT size at truncation function 23015, with the truncated waveform provided to a serial to parallel conversion 23020 function, and provided to FFT 23025, that may output the edge tones 23030-a.

Similarly, center tones 23055 may include a subset of tones around the center of the SC-FDMA symbol. The center tones 23055 processing may include bandpass filtering the received waveform at a filtering function 23035 performed with a filter length $L_1$. The filtered samples may be truncated to a size corresponding to the transmit FFT size at truncation function 23040, with the truncated waveform provided to a serial to parallel conversion 23045 function, and provided to FFT 23050, that may output the center tones 23055.

Likewise, edge tones 23030 may include a subset of tones at the tail, or end, of the SC-FDMA symbol (e.g., edge tones 23030-b). The edge tones 23030-b (e.g., tail tones) processing may include bandpass filtering the received waveform at a filtering function 23060 performed with a filter length $L_3$. The filtered samples may be truncated to a size corresponding to the transmit FFT size at truncation function 23065, with the truncated waveform provided to a serial to parallel conversion 23070 function, and provided to FFT 23075, that may output the edge tones 23030-b.

As discussed above, in some examples the filter length $L_1$ may be selected to be shorter than the filter length $L_2$, which may provide reduced ISI effects at the center tones 23055, and reduced ICI effects and improved OOB suppression for edge tones 23030 (e.g., head tones and tail tones).

The edge tones 23030 and center tones 23055 may then be passed to a subcarrier de-mapper (e.g., subcarrier demapping 22085) to select the assigned M tones. These tones may then be de-spread via M-point IDFT 22090.

Figure 24A:
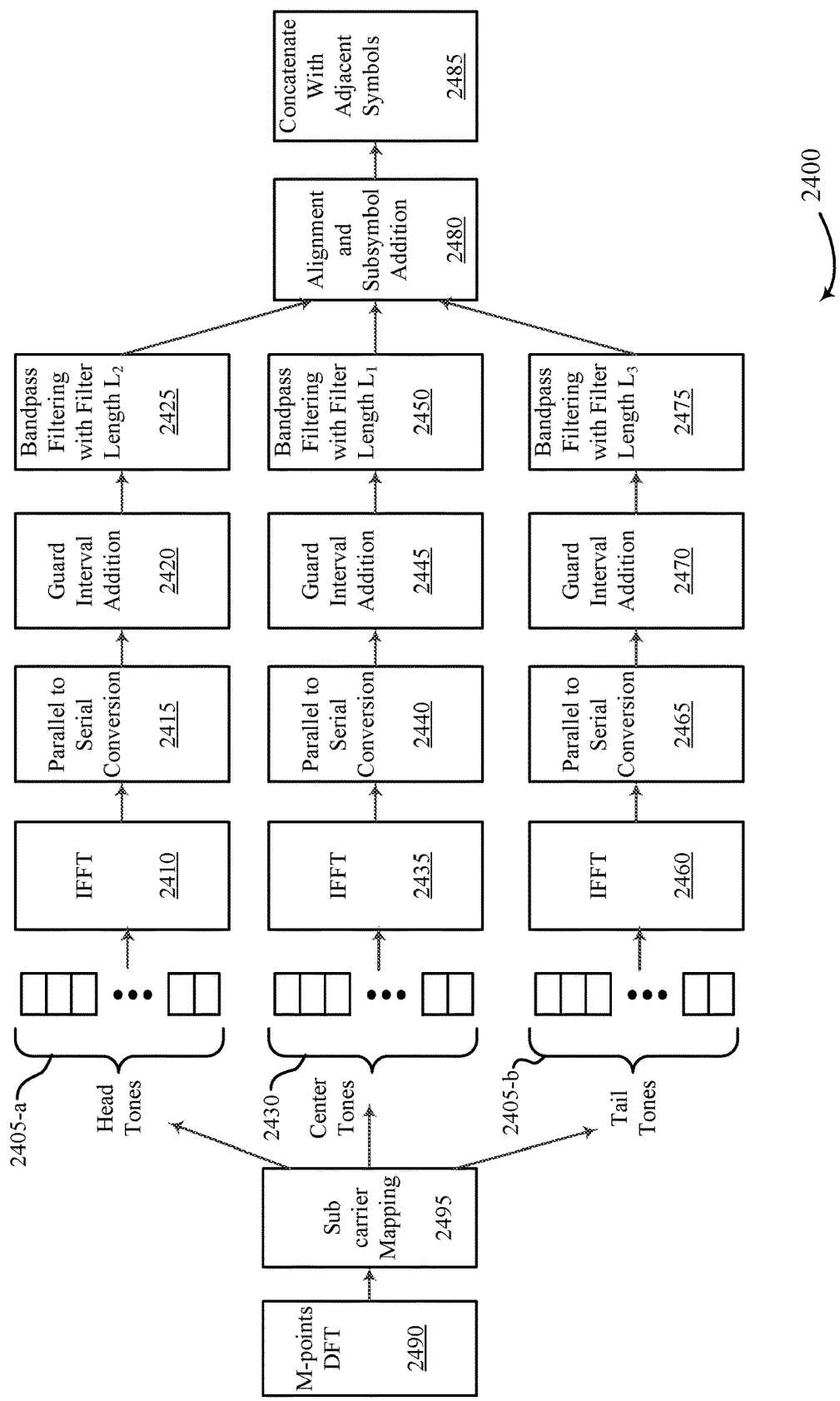
FIG. 24A illustrates an example of transmit processing chains for heterogeneous transmission filtering for SC-FDMA waveforms with guard intervals in accordance with aspects of the present disclosure.

FIG. 24A illustrates an example of transmit processing chains 2400 for heterogeneous transmission filtering for SC-FDMA waveforms with guard intervals. In some cases, processing chains 2400 may represent aspects of techniques performed by a UE or base station as described with reference to FIGS. 1-2.

As discussed above, again various examples may divide DFT spread tones of a SC-FDMA symbols (e.g., M-point DFT 2490 resulting tones), after subcarrier mapping 2495, into two or more subsets of tones, and in some examples each subset of tones may be filtered separately. In the example of FIG. 24A, edge tones 2405 may include a subset of tones at the head, or beginning, of a SC-FDMA symbol (e.g., edge tones 2405-a). The edge tones 2405-a (e.g., head tones) may be provided to IFFT 2410 that may generate a number of samples corresponding to edge tones 2405-a, which may be provided to a parallel to serial conversion 2415 function to generate a series of time samples corresponding to edge tones 2405-a. A guard interval may be added to the time samples at 2420, and guard interval and time samples may be filtered with a filter length $L_2$ at bandpass filter 2425. In some examples, the guard interval may be a zero power guard interval where no power is used in the transmissions for the period of the guard interval.

Similarly, center tones 2430 may include a subset of tones around the center of the SC-FDMA symbol. The center tones 2430 may be provided to IFFT 2435 that may generate a number of samples corresponding to center tones 2430, which may be provided to a parallel to serial conversion 2440 function to generate a series of time samples corresponding to center tones 2430. A guard interval may be added to the time samples at 2445, and the guard interval and time samples may be filtered with a filter length $L_1$ at bandpass filter 2450.

Likewise, edge tones 2405 may include a subset of tones at the tail, or end, of the SC-FDMA symbol (e.g., edge tones 2405-b). The edge tones 2405-b (e.g., tail tones) may be provided to IFFT 2460 that may generate a number of samples corresponding to edge tones 2405-b, which may be provided to a parallel to serial conversion 2465 function to generate a series of time samples corresponding to edge tones 2405-b. A guard interval may be added to the time samples at 2470, and the guard interval and time samples may be filtered with a filter length $L_3$ at bandpass filter 2475.

Each of the filtered sub-symbols may be provided to alignment and sub-symbol addition function 2480 that may assemble the filtered sub-symbols to provide a transmission waveform for the SC-FDMA symbol. The transmission waveform may be concatenated at 2485 with adjacent symbols and may be transmitted by a transmitter.

As discussed above, in some examples the filter length $L_1$ may be selected to be shorter than the filter length $L_2$, which may provide reduced ISI effects at the center tones 2430, and reduced ICI effects and improved OOB suppression for edge tones 2405 (e.g., head tones and tail tones).

Figure 24B:
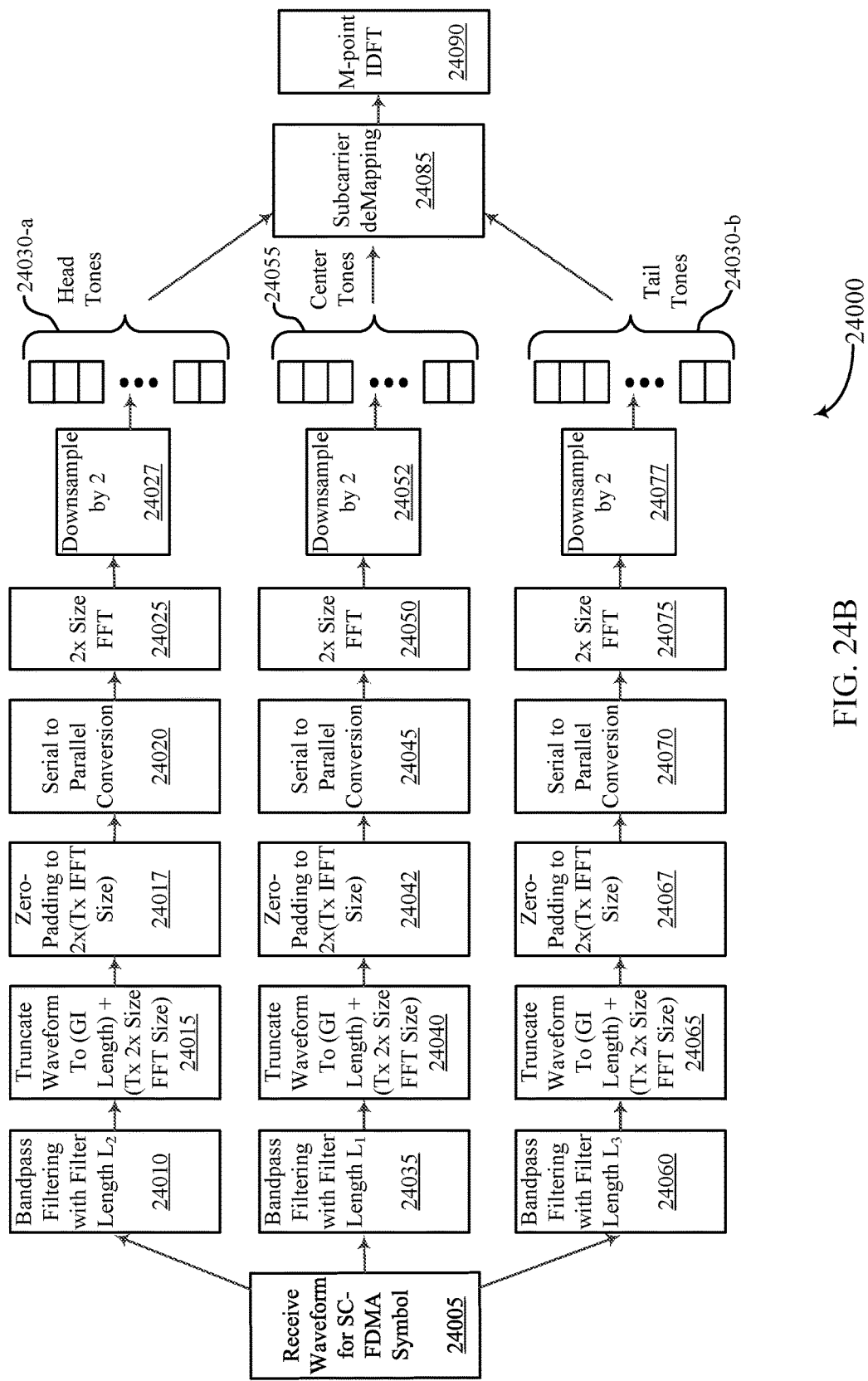
FIG. 24B illustrates an example of receive processing chains for heterogeneous transmission filtering for SC-FDMA waveforms with guard intervals in accordance with aspects of the present disclosure.

FIG. 24B illustrates an example of receive processing chains 24000 for heterogeneous transmission filtering for SC-FDMA waveforms with guard intervals. In some cases, processing chains 24000 may represent aspects of techniques performed by a UE or base station as described with reference to FIGS. 1-2.

As discussed above, again various examples may divide DFT spread tones of a SC-FDMA symbols into two or more subsets of tones, and in some examples each subset of tones may be filtered separately. In the example of FIG. 24B, edge tones 24030-*a* (e.g., head tones) may include a subset of tones at the head, or beginning, of a SC-FDMA symbol. A receiver may receive a SC-FDMA symbol waveform at 24005. Processing for edge tones 24030-*a* (e.g., head tones) may include bandpass filtering the received waveform at a filtering function 24010 performed with a filter length $L_2$. The filtered samples may be truncated to a size corresponding to the transmit FFT size plus a guard interval length at truncation function 24015, with the truncated waveform provided to a zero-padding function 24017 to zero pad the waveform to the transmit IFFT size. The padded output is provided to serial to parallel conversion 24020 function, and provided to a 2-times size FFT 24025. The FFT output may be downsampled by two at downsampling function 24027, that may output the edge tones 24030-*a*.

Similarly, center tones 24055 may include a subset of tones around the center of the SC-FDMA symbol. The center tones 24055 processing may include bandpass filtering the received waveform at a filtering function 24035 performed with a filter length $L_1$. The filtered samples may be truncated to a size corresponding to the transmit FFT size plus a guard interval length at truncation function 24040, with the truncated waveform provided to a zero-padding function 24042 to zero pad the waveform to the transmit IFFT size. The padded output is provided to serial to parallel conversion 24045 function, and provided to a 2-times size FFT 24050. The FFT output may be downsampled by two at downsampling function 24052, that may output the center tones 24055.

Likewise, edge tones 24030-*b* (e.g., tail tones) may include a subset of tones at the tail, or end, of the SC-FDMA symbol. The edge tones 24030-*b* processing may bandpass filtering the received waveform at a filtering function 24060 performed with a filter length $L_3$. The filtered samples may be truncated to a size corresponding to the transmit FFT size plus a guard interval length at truncation function 24065, with the truncated waveform provided to a zero-padding function 24067 to zero pad the waveform to the transmit IFFT size. The padded output is provided to serial to parallel conversion 24070 function, and provided to a 2-times size FFT 24075. The FFT output may be downsampled by two at downsampling function 24077, that may output the edge tones 24030-*b*.

As discussed above, in some examples the filter length $L_1$ may be selected to be shorter than the filter length $L_2$, which may provide reduced ISI effects at the center tones 24055, and reduced ICI effects and improved OOB suppression for edge tones 24030 (e.g., head tones and tail tones).

The edge tones 24030 and center tones 24055 may then be passed to a subcarrier de-mapper (e.g., subcarrier demapping 24085) to select the assigned M tones. These tones may then be de-spread via M-point IDFT 24090.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these.
Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (e.g., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Uplink transmissions using SC-FDMA (or other multiple access technologies), and the WOLA weighting or bandpass filtering techniques described herein may be applied to such uplink symbols that are transmitted from a UE according to the examples described above with reference to FIGS. 5-24. The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication, comprising:
   identifying a set of tones of a first symbol, a first subset of the set of tones, and a second subset of the set of tones, wherein the first subset of the set of tones comprises a center portion of the set of tones and the second subset of the set of tones comprises an edge portion of the set of tones;
   applying a first type of weighting window to the first subset of the set of tones and a second type of weighting window to the second subset of the set of tones in a weighted overlap and add (WOLA) procedure, the second type of weighting window being longer than the first type of weighting window;
   obtaining a first transmission waveform for the first symbol based at least in part on the applying; and
   transmitting the first transmission waveform.

2. The method of claim 1, wherein the first symbol comprises an orthogonal frequency division multiplexing (OFDM) symbol or a single carrier frequency division multiple access (SC-FDMA) symbol.

3. The method of claim 1, further comprising:
   identifying a third subset of the set of tones comprising a tail portion or a head portion of the set of tones, and
   wherein the applying further comprises applying a third type of weighting window to the third subset of the set of tones in the WOLA procedure to obtain the first transmission waveform.

4. The method of claim 3, wherein the third type of weighting window is longer than the first type of weighting window.

5. The method of claim 3, wherein the third type of weighting window is a same weighting window as the second type of weighting window.

6. The method of claim 1, wherein the applying comprises:
   selecting a first weighting length for a first weighting procedure to be performed on the first subset of the set of tones and selecting a second weighting length for a second weighting procedure to be performed on the second subset of the set of tones;
   performing the first weighting procedure on the first subset of the set of tones to obtain a weighted first subset of samples corresponding to the first subset of the set of tones and performing the second weighting procedure on the second subset of the set of tones to obtain a weighted second subset of samples corresponding to the second subset of the set of tones; and
   overlapping and adding the weighted first subset of samples and the weighted second subset of samples to obtain the first transmission waveform.

7. The method of claim 6, wherein performing the first weighting procedure comprises:
   adding a cyclic prefix and a first extension length to a first subset of time domain samples corresponding to the first subset of the set of tones, the first extension length corresponding to the first weighting length.

8. The method of claim 7, wherein performing the second weighting procedure comprises:

adding the cyclic prefix and a second extension length to a second subset of time domain samples corresponding to the second subset of the set of tones, the second extension length corresponding to the second weighting length.

9. The method of claim 1, further comprising:
repeating the identifying and the applying for a second set of tones of a second symbol to obtain a second transmission waveform for the second symbol;
overlapping and adding the first transmission waveform and the second transmission waveform; and
transmitting the overlapped and added first transmission waveform and second transmission waveform.

10. The method of claim 9, wherein an amount of overlapping of the first transmission waveform and the second transmission waveform is determined based at least in part on a longest length of the first type of weighting window and the second type of weighting window.

11. A method for wireless communication, comprising:
receiving a first transmission waveform for a first symbol;
applying a first type of weighting window in a weighted overlap and add (WOLA) procedure to the first transmission waveform and a second type of weighting window in the WOLA procedure to the first transmission waveform, the second type of weighting window being longer than the first type of weighting window;
identifying a first subset of tones of the first symbol based at least in part on the applying the first type of weighting window to the first transmission waveform; and
identifying a second subset of tones of the first symbol based at least in part on the applying the second type of weighting window to the first transmission waveform, wherein the first subset of the set of tones comprises a center portion of the set of tones and the second subset of the set of tones comprises an edge portion of the set of tones.

12. The method of claim 11, wherein the first symbol comprises an orthogonal frequency division multiplexing (OFDM) symbol or a single carrier frequency division multiple access (SC-FDMA) symbol.

13. The method of claim 11, further comprising:
identifying a third subset of tones comprising a tail portion or a head portion of tones, and
wherein the applying further comprises applying a third type of weighting window to the third subset of tones in the WOLA procedure to obtain the first transmission waveform.

* * * * *